US011210658B2

(12) United States Patent
Silvestri et al.

(10) Patent No.: US 11,210,658 B2
(45) Date of Patent: Dec. 28, 2021

(54) CONSTRUCTING A DISTRIBUTED LEDGER TRANSACTION ON A COLD HARDWARE WALLET

(71) Applicant: iCoin Technology, Inc., Campbell, CA (US)

(72) Inventors: Chester Silvestri, Los Gatos, CA (US); Adam Silvestri, Campbell, CA (US); Douglas Kadlecek, San Francisco, CA (US)

(73) Assignee: iCoin Technology, Inc., Campbell, CA (US)

( * ) Notice: Subject to any disclaimer, the term of this patent is extended or adjusted under 35 U.S.C. 154(b) by 0 days.

(21) Appl. No.: 17/242,935

(22) Filed: Apr. 28, 2021

(65) Prior Publication Data
US 2021/0357914 A1    Nov. 18, 2021

Related U.S. Application Data

(63) Continuation-in-part of application No. 16/934,754, filed on Jul. 21, 2020, now Pat. No. 10,999,260.
(Continued)

(51) Int. Cl.
*H04L 29/06* (2006.01)
*G06Q 20/36* (2012.01)
(Continued)

(52) U.S. Cl.
CPC ..... *G06Q 20/3674* (2013.01); *G06Q 20/0655* (2013.01); *G06Q 20/3676* (2013.01);
(Continued)

(58) Field of Classification Search
CPC ............. H04L 63/0435; H04L 63/0442; H04L 9/0825; H04L 9/0827; H04L 9/0894; G06F 21/71
(Continued)

(56) References Cited

U.S. PATENT DOCUMENTS 9,755,825 B2 * 9/2017 O'Brien ................ H04L 9/0844
10,102,510 B2   10/2018 Yau et al.
(Continued)

FOREIGN PATENT DOCUMENTS

CA    3044991    12/2019
EP    2701416    2/2014

OTHER PUBLICATIONS

US 10,498,713 B1, 12/2019, Hayes et al. (withdrawn)
(Continued)

*Primary Examiner* — Longbit Chai
(74) *Attorney, Agent, or Firm* — Henry Patent Law Firm PLLC

(57) ABSTRACT

In a general aspect, a distributed ledger transaction is generated on a cold hardware wallet. Generating the distributed ledger transaction includes receiving, at the cold hardware wallet, ledger information from a network-connected device via a private module-to-device communication link. The ledger information may include account information for the distributed ledger transaction, and a timestamp identifying when the account information was received by the network-connected device from a public network. The cold hardware wallet may generate a message based on the account information, identify a private key stored in the cold hardware wallet, generate a digital signature based on the message and the private key, and generate the distributed ledger transaction based on the message and the digital signature. The cold hardware wallet may send the distributed ledger transaction to the network-connected device via the private module-to-device communication link for forwarding to the public network for settlement.

21 Claims, 20 Drawing Sheets

Related U.S. Application Data

(60) Provisional application No. 63/023,359, filed on May 12, 2020.

(51) Int. Cl.
  *H04L 9/32* (2006.01)
  *H04L 9/08* (2006.01)
  *G06Q 20/38* (2012.01)
  *G06Q 20/06* (2012.01)
  *G06F 3/0488* (2013.01)

(52) U.S. Cl.
  CPC ....... *G06Q 20/389* (2013.01); *G06Q 20/3825* (2013.01); *G06Q 20/3829* (2013.01); *H04L 9/0869* (2013.01); *H04L 9/3247* (2013.01); *G06F 3/04883* (2013.01); *G06Q 20/386* (2020.05); *H04L 2209/38* (2013.01); *H04L 2209/56* (2013.01)

(58) Field of Classification Search
  USPC ......................................................... 713/171
  See application file for complete search history.

(56) References Cited

U.S. PATENT DOCUMENTS

| | | | | |
|---|---|---|---|---|
| 10,263,790 | B2* | 4/2019 | Gulati | G06F 21/575 |
| 10,275,758 | B2 | 4/2019 | Lund | |
| 10,496,989 | B2 | 12/2019 | Castinado et al. | |
| 2004/0010721 | A1 | 1/2004 | Kirovski et al. | |
| 2009/0083538 | A1 | 3/2009 | Merugu et al. | |
| 2016/0162873 | A1 | 6/2016 | Zhou et al. | |
| 2018/0241726 | A1 | 8/2018 | White et al. | |
| 2019/0034919 | A1 | 1/2019 | Nolan et al. | |
| 2019/0121988 | A1* | 4/2019 | van de Ruit | H04L 9/0825 |
| 2019/0245844 | A1 | 8/2019 | Vijayasankar et al. | |
| 2019/0251199 | A1 | 8/2019 | Klianev | |
| 2019/0251524 | A1 | 8/2019 | Sadrizadeh et al. | |
| 2019/0325408 | A1 | 10/2019 | Goroff et al. | |
| 2019/0362340 | A1 | 11/2019 | Strong et al. | |
| 2020/0042996 | A1 | 2/2020 | Mayblum et al. | |
| 2020/0053056 | A1 | 2/2020 | Mathias et al. | |
| 2020/0074778 | A1 | 3/2020 | Shapira et al. | |
| 2020/0084097 | A1* | 3/2020 | Marks | G06Q 20/38215 |
| 2020/0090164 | A1 | 3/2020 | Hyuga et al. | |
| 2020/0193420 | A1 | 6/2020 | Vogel et al. | |

OTHER PUBLICATIONS

"Mobile Protocol: Detailed Description", downloaded from https://core.telegram.org/mtproto/description at least as early as Feb. 6, 2020, 6 pgs.‡

"WhatsApp Encryption Overview", WhatsApp, Apr. 5, 2016, 12 pgs.‡

"End-to-End Encryption, Secret Chats", downloaded from https://core.telegram.org/api/end-to-end at least as early as Feb. 6, 2020, 6 pgs.‡

KIPO, International Search Report and Written Opinion dated May 13, 2021, in PCT/US2021/014545, 12 pgs.

USPTO, Notice of Allowance dated Jan. 8, 2021, in U.S. Appl. No. 16/934,754, 12 pgs.

USPTO, Non-Final Office Action dated Sep. 14, 2020, in U.S. Appl. No. 16/934,754, 17 pgs.

"WhatsApp Encryption Overview", WhatsApp, Apr. 5, 2017.

WIPO, International Search Report and Written Opinion dated Aug. 10, 2021, in PCT/US2021/029642, 14 pgs.

* cited by examiner
‡ imported from a related application

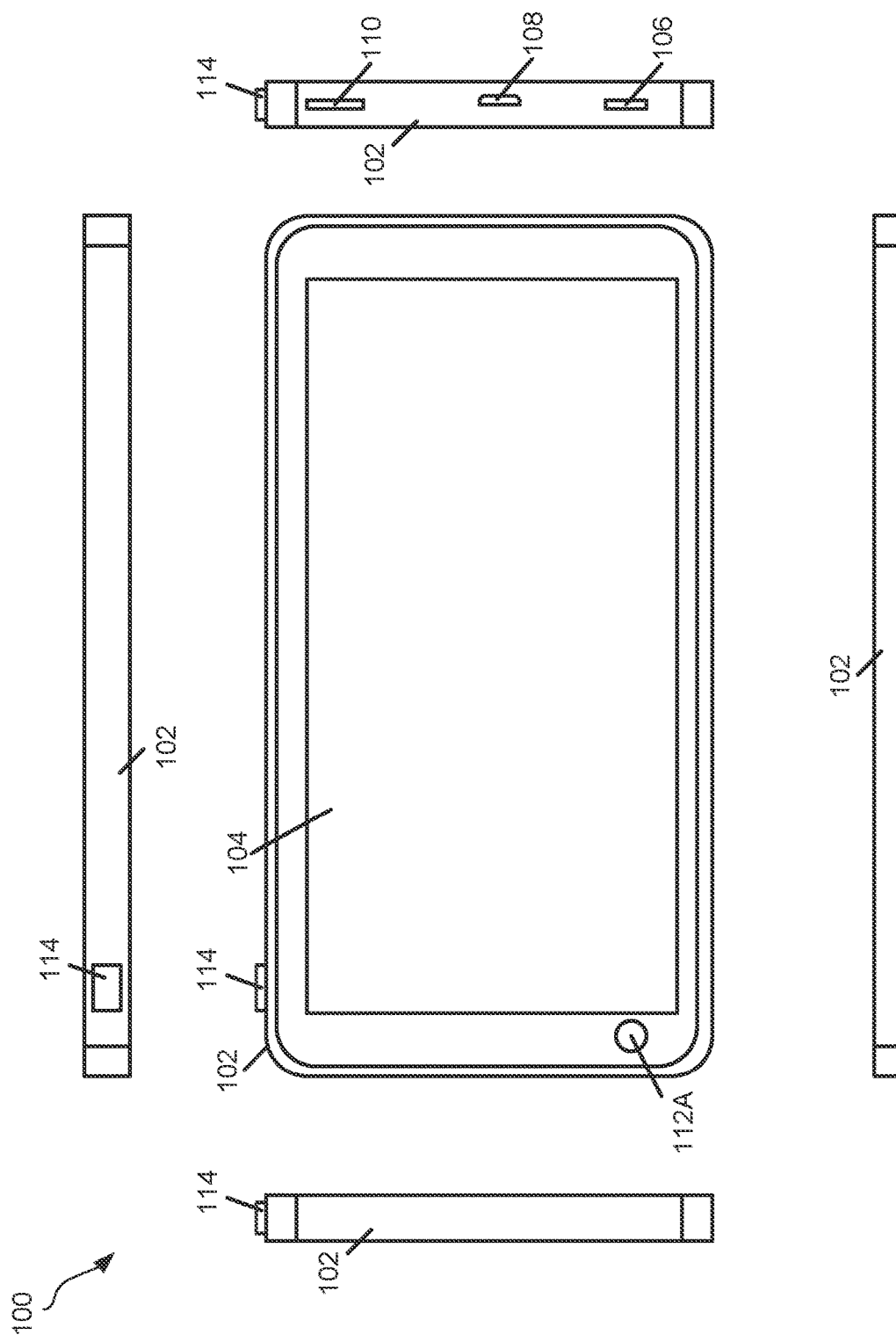

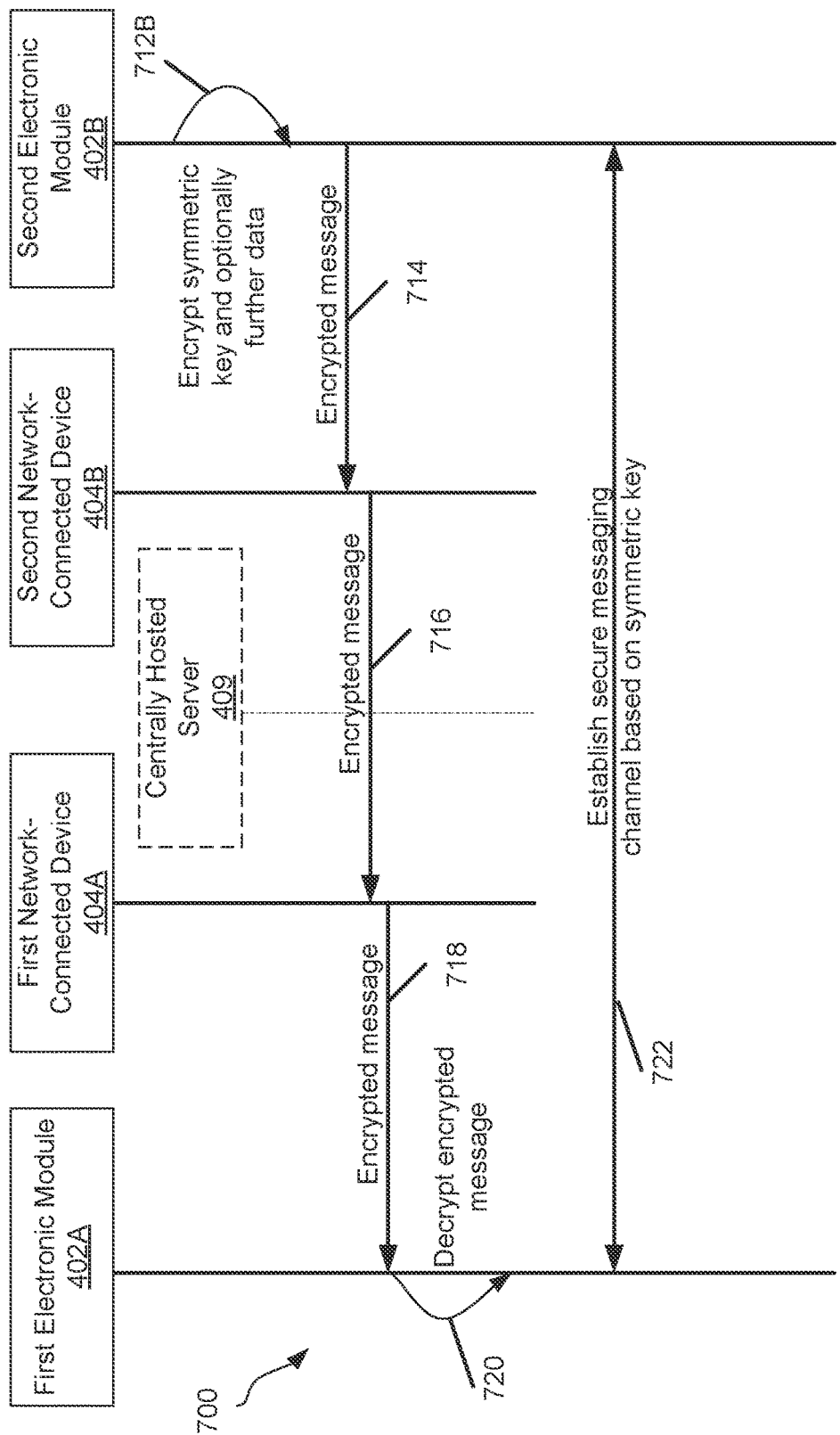
Fig. 7, cont'd

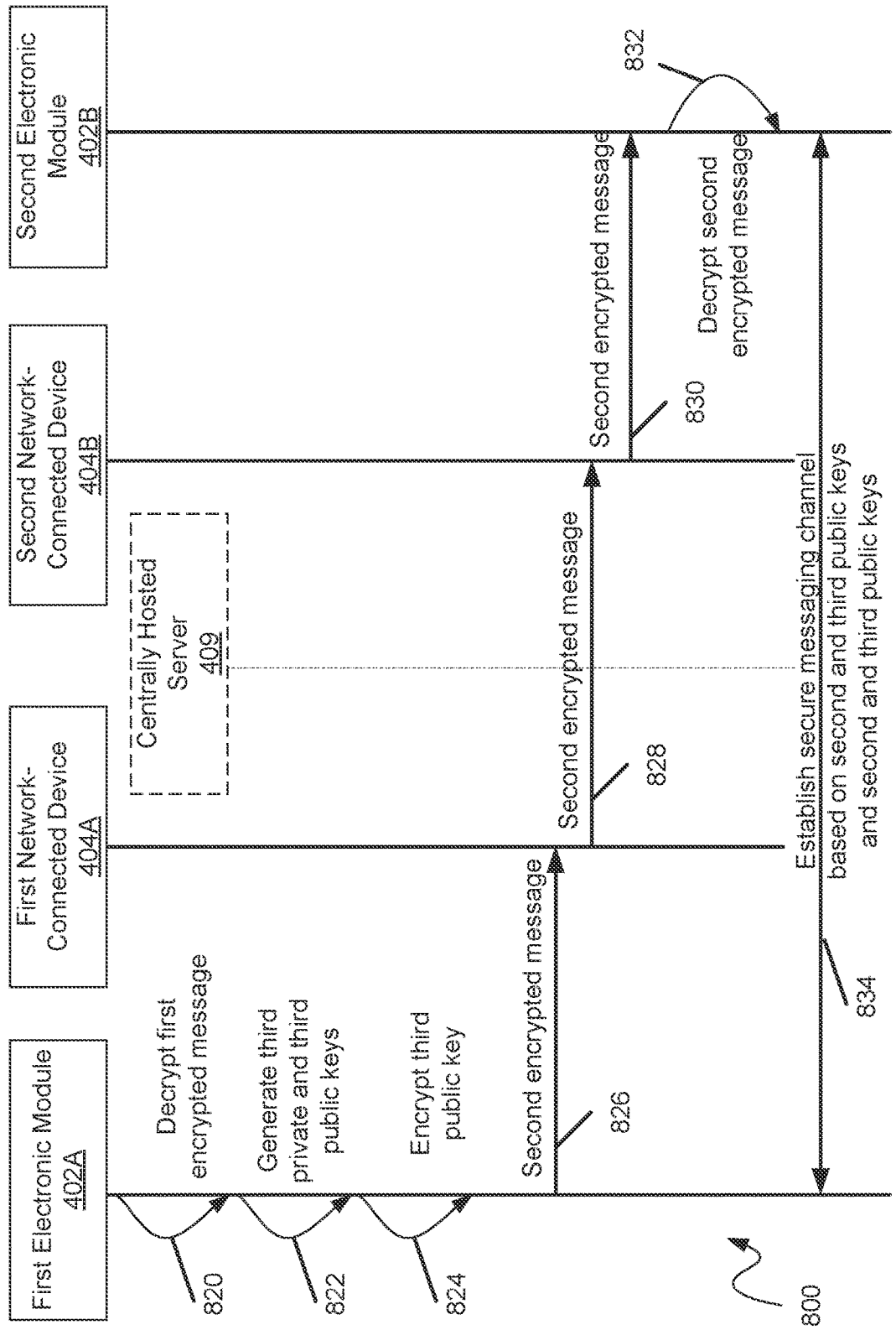
Fig. 8, cont'd

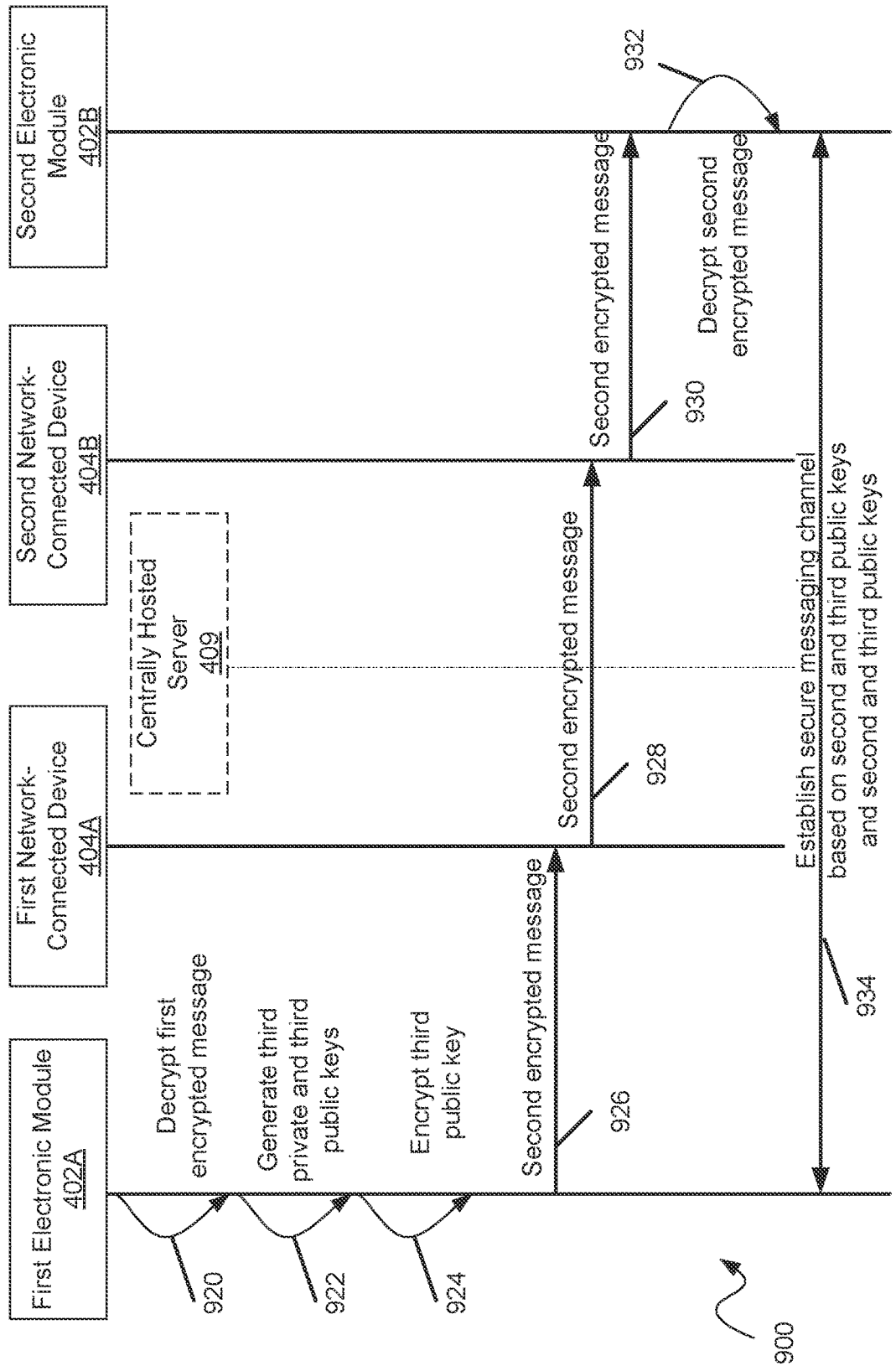
Fig. 9, cont'd

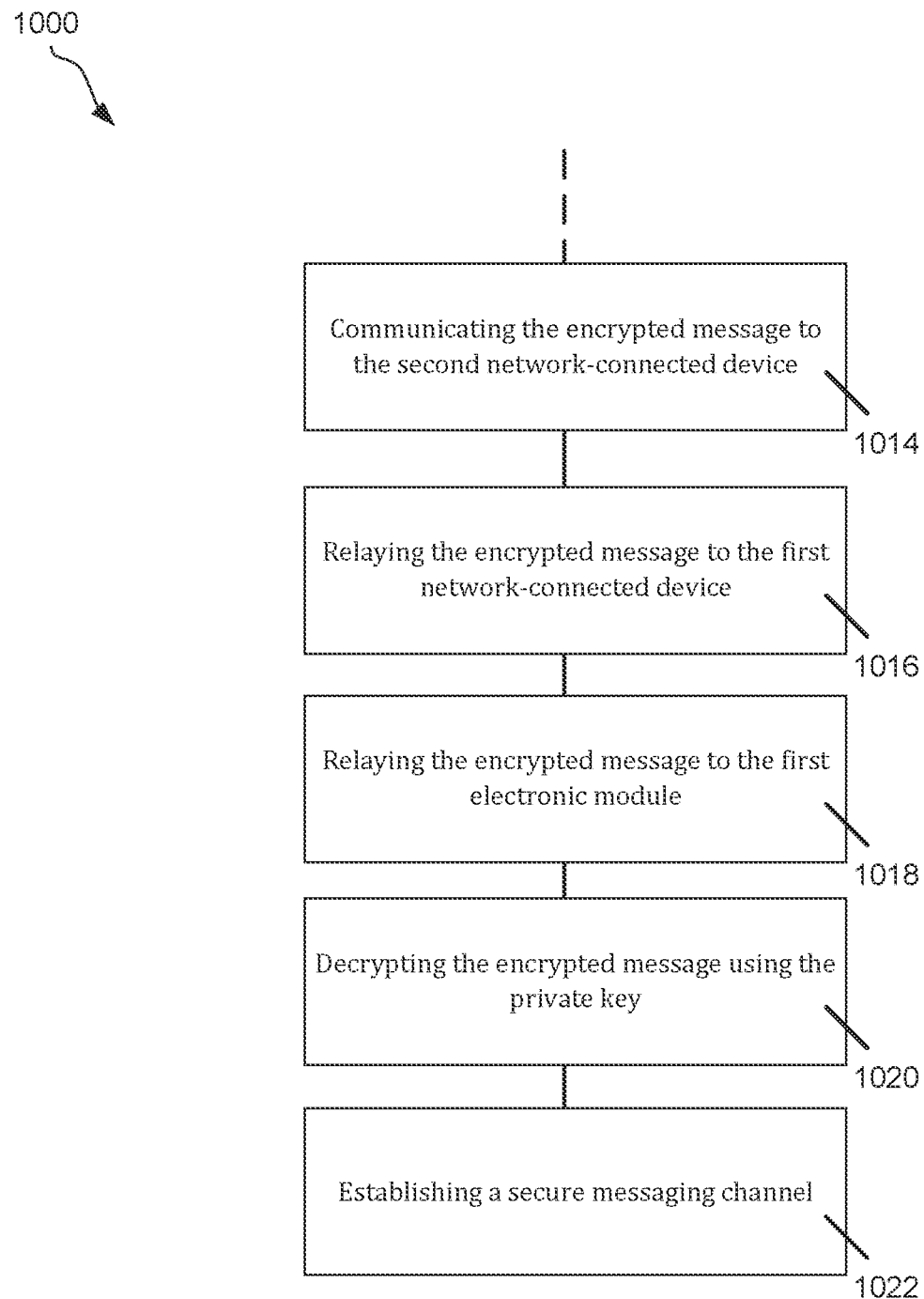
Fig. 10, cont'd

Characters Entered :  A   B   C   D   E

Respective Times :  t1   t2   t3   t4   t5

Time differences :  (t2-t1)  (t3-t2)  (t4-t3)  (t5-t4)

CONSTRUCTING A DISTRIBUTED LEDGER TRANSACTION ON A COLD HARDWARE WALLET

CROSS-REFERENCE TO RELATED APPLICATIONS

The present application is a continuation-in-part of U.S. patent application Ser. No. 16/934,754, filed Jul. 21, 2020, entitled "Secure Messaging Between Cryptographic Hardware Modules," which claims priority to U.S. Provisional patent application Ser. No. 63/023,359, filed May 12, 2020, entitled "Secure Messaging Between Cryptographic Hardware Modules" the disclosures of which are hereby incorporated by reference in their entirety.

BACKGROUND

The following description relates to constructing a distributed ledger transaction on a cold hardware wallet.

Blockchains allow a network of users to make a digital ledger of data and share the data among the other users in the network. Unlike previous database structures, the blockchain database is maintained by a multitude of independent nodes spread across a large distributed network. When a transaction is recorded into the blockchain database, it is very difficult, if not impossible, to change or remove that transaction from the database since the transaction is stored in more than one node in the distributed network. Therefore, transactions are added into the blockchain database by multiple users and changing the recorded transactions would require each of these users (or a majority of the users) to agree to the change. This distribution of control to add, edit, and remove data from the blockchain database creates trust amongst users in the network, especially when users are not familiar with one another.

DESCRIPTION OF DRAWINGS

FIGS. 1A-1B illustrate an example electronic module.

DETAILED DESCRIPTION

Figure 1B:
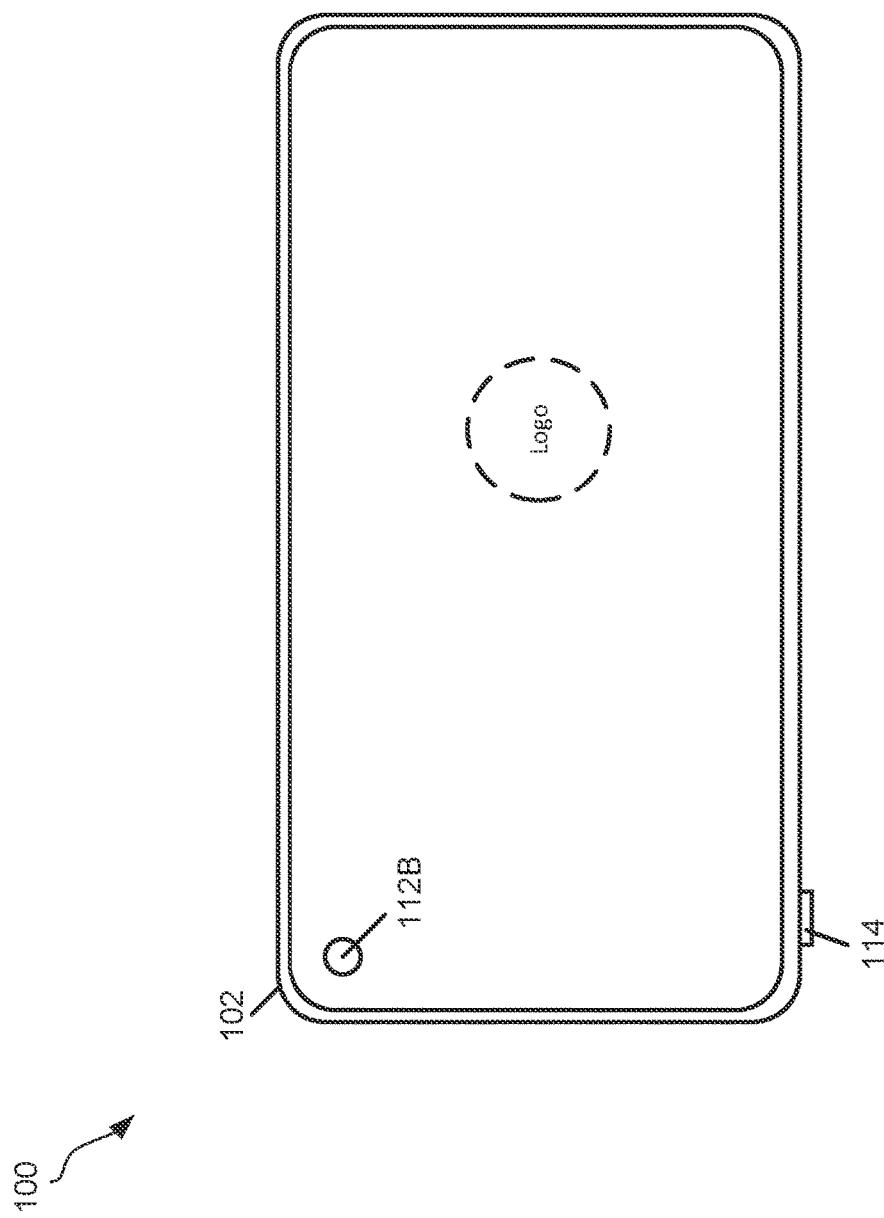

In some aspects of what is described here, electronic modules (e.g., cryptographic hardware modules or cold hardware wallets) are configured to transmit information between them securely using a public communications protocol, to securely exchange information, thereby achieving direct module-to-module communication. In some examples, network-connected devices (e.g., mobile phones, personal computers, or other network-connected devices) act as a communication gateway to initially establish a secure messaging channel between or among the electronic modules. Once established, the electronic modules may communicate securely with each other using the secure messaging channel, without use of the network-connected devices as intermediaries and without the use of a central authority (e.g., a centrally hosted server) to manage the encryption and decryption of messages exchanged between the electronic modules.

In some examples, after establishment of the secure messaging channel, the electronic modules may continue using open messaging platforms (e.g., third party messaging channels that use intermediaries) to communicate with each other since messages exchanged between the electronic modules are encrypted and readable only on the electronic modules. Examples of open messaging platforms that may be used include Whatsapp, Telegram, Signal, SnapChat, Messenger, Facebook messaging, iMessage, SMS, e-mail, etc. In some implementations, users of the electronic modules may be able to decide (e.g. via a user input to the electronic modules) whether messages are to be shared with each other using the secure messaging channel or the open messaging platforms. In some examples, information (e.g., text messages, documents, images, videos, or the like) exchanged between the electronic modules may be transferred by one or more of the electronic modules to a cloud-based file storage service for encrypted storage thereon.

In some examples, an electronic module includes a general-purpose processor (e.g., a microprocessor unit or a microcontroller unit) and a separate cryptographic processor. The cryptographic processor may execute one or more cryptography algorithms to generate public/private key pairs and secure digital signatures. In some examples, the cryptographic processor may communicate the secure digital signatures or the public key of the private key/public key pair to the general-purpose processor. The general-purpose processor may subsequently communicate the public keys or secure digital signatures to the outside world (e.g. to an application running on a mobile phone or personal computer). The private key of the private key/public key pair, however, is not output from the cryptographic processor. In some examples, the cryptographic processor may have separate shielding to prevent trespass from outside. The cryptographic processor may be isolated from outside networks and to avoid tampering or other mischief with the private key. In some examples, the cryptographic processor does not receive information from the outside world during normal operation, and consequently is less susceptible to attack or other mischief.

In some examples, the cryptographic processor may be configured to generate symmetric and asymmetric key pairs using various cryptographic algorithms (e.g., the Elliptic Curve Digital Signature Algorithm). The same security used to generate and store asymmetric key pairs can be applied to secure messaging by securely storing the keys used for encryption and decryption.

The symmetric and asymmetric key pairs generated by the cryptographic processor for secure messaging may be different from the private keys used in cryptocurrency (e.g., bitcoin) transactions. Nonetheless, the symmetric and asymmetric key pairs are tamper-resistant and as secure as the private keys used in cryptocurrency (e.g., bitcoin) transactions. By storing the keys used for secure messaging on the electronic module (e.g., a cold storage wallet), a user's confidence in genuine encryption & decryption of private messages is enhanced.

In some examples, secure messages (e.g., encrypted versions thereof) can only be generated, read, or displayed on the cold storage device. In some examples, the electronic module uses peer-to-peer communication protocol (e.g., Bluetooth) to transmit encrypted messages to a network-connected device such as a mobile phone or personal computer. In such examples, the network-connected devices do not have access to an unencrypted message or the corresponding keys used for decryption. With the electronic module having no connection to the Internet or other network, the types of snooping that can take place on the network-connected device is limited.

Since communications between electronic modules are encrypted, messaging networks are prevented from being able to store and collect unencrypted communication data, which can be misused to advance their own profit motives often at the unknown expense of the user. Although encrypted messaging applications are currently available, these encrypted messaging applications are used on a network-connected device (e.g., a mobile phone or a personal computer), and thus encryption/decryption keys are exposed to attackers having the ability to compromise the security of the network-connected device (e.g., by gaining control of the network-connected device via a network connection, a hardwire connection, a malicious application, or backdoor access created by the manufacturer of the network-connected device). By compromising the security of the network-connected device, the attackers also have access to information (e.g., text messages, documents, images, videos, or the like) at the network-connected device since such information is created, read, or displayed at the compromised network-connected device. In addition to generating, reading, or displaying information at the compromised network-connected device, currently available encrypted messaging applications generate the symmetric or asymmetric keys on the compromised network-connected device. In contrast to currently available encrypted messaging applications, the electronic modules described here can generate symmetric or asymmetric keys such that the keys are inaccessible to anyone but a user in physical possession of the electronic module. Additionally, the electronic modules described here can generate, read, or display information (e.g., text messages, documents, images, videos, or the like) such that the information (whether unencrypted or encrypted) is inaccessible to anyone but a user in physical possession of the electronic module. In some examples, further measures to limit access to the electronic module can be done through a secure pin, facial recognition, and fingerprint authentication.

According to various implementations, the electronic module can be a cold hardware wallet. The cold hardware wallet can be used to construct a distributed ledger transaction. The cold hardware wallet uses current/live network information (e.g., in the form of time-stamped ledger information) obtained from a network-connected device and encryption keys stored on the cold hardware wallet to accurately construct the distributed ledger transaction. This is in contrast to existing methods of generating a distributed ledger transaction, where a desktop browser or a mobile network-connected device is used to construct a distributed ledger transaction, and where a cold hardware wallet is connected (e.g., via a USB connection) to the desktop browser or mobile network-connected device to provide the encryption keys to the desktop browser or mobile network-connected device for the construction of the distributed ledger transaction, thus exposing the cold device and its contents to network vulnerabilities. Additionally, a screen, data port, microphone, and/or camera of the cold hardware wallet can be used to provide an external input to the cold hardware wallet. The external input can also be provided through a peripheral device coupled to the cold hardware wallet (e.g., via a wired and/or wireless connection). The external input can be used by the cold hardware wallet to generate a salt to increase the randomness of entropy to a cryptographically secure level. The unique random entropy can be used by the cold hardware wallet to generate seeds or encryption keys (e.g., asymmetric key pairs, symmetric key pairs, or both) for use by the cold hardware wallet. Since the randomness of the entropy is increased to a cryptographically secure level, the encryption keys are less likely to be broken (e.g., derived by an adversary) and encrypted information is less likely to be revealed as a result.

FIGS. 1A-1B illustrate an example electronic module 100. In some implementations, the electronic module 100 can be a cold hardware wallet that is communicatively isolated from a public network. Example public networks include the Internet, a distributed ledger network (e.g., a Blockchain network), a cellular network, or other types of public messaging channels. Since the cold hardware wallet is communicatively isolated from a public network, the cold hardware wallet can provide offline generation and storage of encryption keys (e.g., asymmetric key pairs, symmetric key pairs, or both) and other information. As such, the contents of the cold hardware wallet are isolated from an adversary that has access to, or is connected to, a public network. FIG. 1A shows a front side of the electronic module 100 along with profiles of various sides of the electronic module 100. FIG. 1B shows a back side of the electronic module 100. In some implementations, the electronic module 100 is a hardware encryption module (e.g., a cold hardware wallet) that generates encryption keys or cryptocurrency private keys, cryptocurrency public keys, and cryptocurrency addresses; securely stores credentials (e.g., the encryption keys); and produces or verifies transactions (e.g., cryptocurrency or token transactions, for example, Bitcoin transactions occurring on the blockchain network). As seen in FIGS. 1A and 1B, the electronic module 100 includes a hard casing 102, a screen 104, an optional battery charging port 106, an optional data port 108, an optional microphone or speaker 110, an optional camera 112A at the front side, an optional camera 112B at the back side, and a power button 114 that is configured to turn the electronic module 100 on or off. In some implementations, an electronic module 100 that omits the data port 108 may be more secure than an electronic module having the data port 108 (e.g., since absence of the data port 108 provides an additional layer of communicative isolation for the electronic module 100 and its contents). The placement and positions of the various components of the electronic module 100 are exemplary and may vary in other implementations of the electronic module 100. The data port 108 may be a USB port, an Ethernet, a FireWire, a Lightning port, or the like. In some implementations, the data port 108 may also serve as the battery charging port 106 of the electronic module 100. The screen 104 may be a capacitive screen or a resistive screen. Consequently, the screen 104 may be a touch-sensitive screen configured to display information (e.g., text messages, documents, images, videos, or the like) to a user and to receive an input from the user to the electronic module 100. As an example, the screen 104 may display an image of a keyboard and the user may input an alphanumeric string to the electronic module 100 by interacting with the image of the keyboard to create and edit text. In some implementations, a secure pin may be entered through the interaction with the image of the keyboard, thereby limiting access to the electronic module to authorized users. In some implementations, facial recognition (e.g., using the camera 112A or 112B) or fingerprint authentication (e.g., using the screen 114) may additionally or alternatively be used to limit access to the electronic module to authorized users.

In implementations of the electronic module 100 that include the microphone 110, the user may generate an audio recording (e.g., stored locally on the electronic module 100) that can be encrypted and communicated to another electronic module (e.g., as described in further detail below in reference to FIGS. 5-11). In a similar manner, in implementations of the electronic module 100 that include the camera 112A or 112B, the user may generate an image file or video recording (e.g., stored locally on the electronic module 100) that can be encrypted and communicated to another electronic module (e.g., as described in further detail below in reference to FIGS. 5-11). In some implementations, the electronic module 100 may be coupled to an external or peripheral device (e.g., via the data port 108 or through a wireless communication link such as WiFi, Bluetooth, Near Field Communication, or the like) and information (e.g., an image, an audio or video recording, a document, or other type of information) from the external or peripheral device may be transferred to the electronic module 100. The information may subsequently be communicated to another electronic module (e.g., as described in further detail below in reference to FIGS. 5-11). In some implementations, the external or peripheral device may include a monitor (e.g., for viewing information), a keyboard device (e.g., for creating or editing text), a mouse device, an external microphone, a printer or scanner, an external memory, an external camera (e.g., a web cam), an external voice recorder, among others.

In some instances, at least one of the screen 104, data port 108, microphone or speaker 110, or cameras 112A or 112B can be used to provide an external input to the electronic module 100. The external input can also be provided to the electronic module 100 through a peripheral device coupled to the electronic module 100 (e.g., via the data port 108 or through a wireless communication link such as WiFi, Bluetooth, Near Field Communication, or the like). As discussed in further detail below, the electronic module 100 can use the external input to generate a salt to increase the randomness of entropy to a cryptographically secure level. The unique random entropy can be used by the electronic module 100 to generate seeds or encryption keys (e.g., asymmetric key pairs, symmetric key pairs, or both) for use by the electronic module 100. Since the randomness of the entropy is increased to a cryptographically secure level, the encryption keys are less likely to be broken (e.g., derived by an adversary) and encrypted information is less likely to be revealed as a result.

In some examples, the electronic module 100 is manufactured by a hardware wallet provider that associates a unique identifier (e.g., a serial number or other unique device identifier) to the electronic module 100. In some implementations, the unique identifier is burned or embedded into the hardware of the electronic module 100 (e.g., during manufacture of the electronic module 100).

Figure 2:
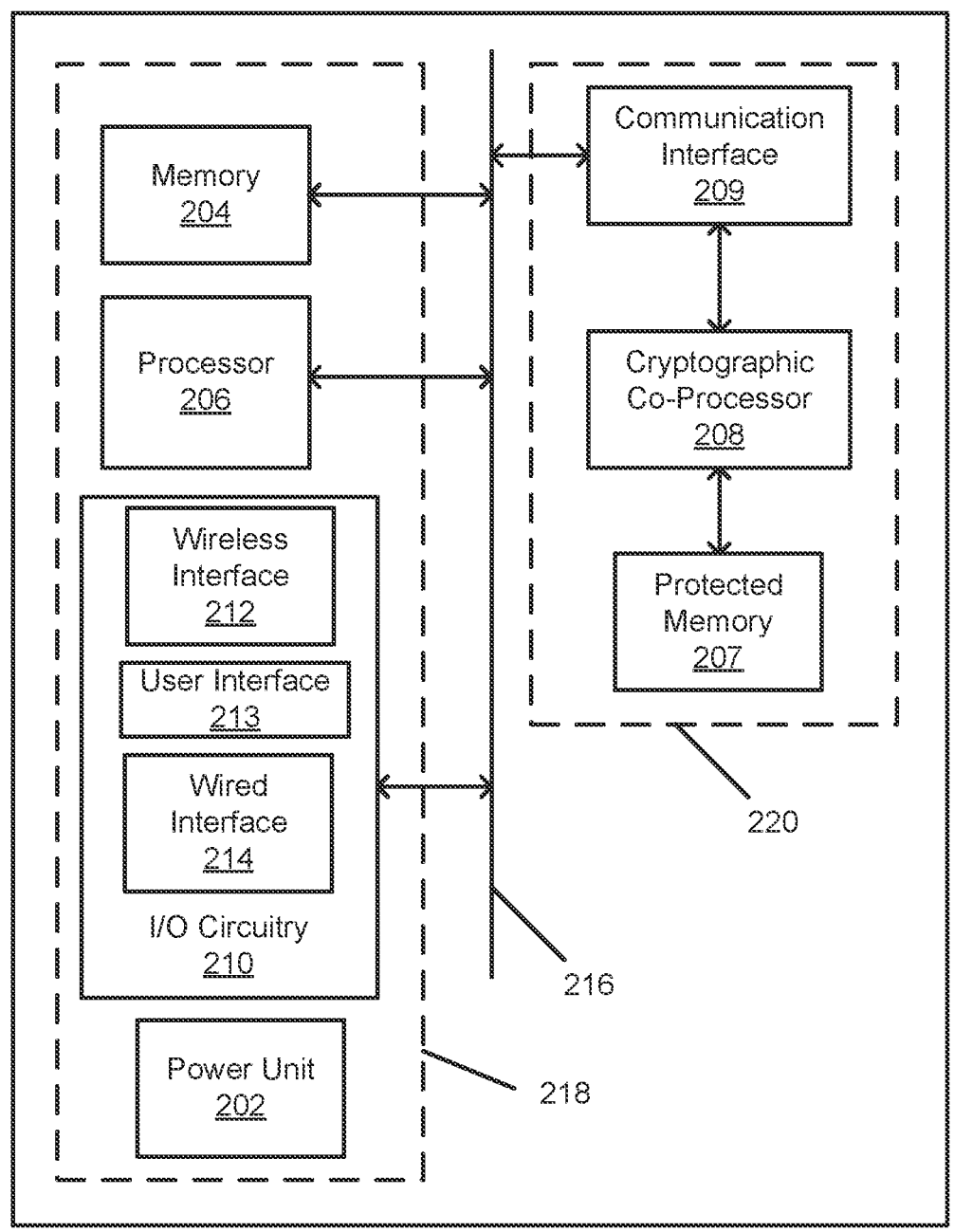
FIGS. 2 and 3 are block diagrams showing example implementations of an electronic module.

FIG. 2 is a block diagram showing an example of the electronic module 100. The electronic module 100 includes a power unit 202, memory 204, a processor 206 (e.g., a general-purpose processor), protected memory 207, a cryptographic co-processor 208, communication interface 209, and input/output (I/O) circuitry 210. In some implementations, the I/O circuitry 210 may include one or more wireless interfaces 212, one or more user interfaces 213, or one or more wired interfaces 214. The various components of the electronic module 100 may be coupled to one another through one or more busses 216. In some implementations, the electronic module 100 may include additional or different components. The cryptographic co-processor 208 may be configured to perform cryptographic functions of the electronic module 100 (e.g., generate and store private keys, sign transactions, and perform encryption and decryption). In the example shown in FIG. 2, the cryptographic co-processor 208 is not on the same circuit as the processor 206 and is instead connected to the one or more busses 216 through the communication interface 209 (e.g., an interfacing circuit board). The cryptographic co-processor 208 may store information that is relied upon from a security or cryptographic perspective (e.g., private keys or unique identifiers) on the protected memory 207. In some implementations, the memory 204, the protected memory 207, or both, may be encrypted. The memory 204 may be the primary working memory of the electronic module 100, while the protected memory 207 (which may be referred to as "shielded memory" in some Trusted Platform Module (TPM) applications) is isolated (e.g., spatially or functionally isolated) from the memory 204 such that the protected memory 207 can only be accessed by the cryptographic co-processor 208.

As seen in the example of FIG. 2, the electronic module 100 may include an unsecured region 218 and a secured region 220. The secured region 220 is configured to be resistant to security vulnerabilities (e.g., hacking, viruses, worms, trojans, and the like). In some implementations, the secured region 220 may be formed by separately shielding the protected memory 207, the cryptographic co-processor 208, and the communication interface 209 from other components of the electronic module 100. Additionally or alternatively, the secured region 220 may be made resistant to security vulnerabilities by encrypting protected memory 207. The secured region 220 may include data and components (e.g., the cryptographic co-processor 208) that are relied upon from a security or cryptographic perspective, where access to such data or components by a third party (e.g., an adversary) could compromise the security of the electronic module 100. As an example, random numbers, private keys, and encryption keys (e.g., asymmetric or symmetric keys) are generated, encrypted, and stored within the confines of the secured region 220 since access to such data could compromise the security of the electronic module 100. The unsecured region 218, on the other hand, is not relied upon from a security or cryptographic perspective and may include components of the electronic module 100 that may be used as a channel, source, or destination for data entering or exiting the electronic module 100. For example, the unsecured region 218 may include components (e.g., power unit 202, memory 204, processor 206, I/O circuitry 210) that, even if subject to security vulnerabilities, do not compromise the security of the electronic module 100. As an example, public keys, which are mathematically related to the private keys generated in the secured region 220, may be freely distributed within the unsecured region 218.

The example power unit 202 provides power to the other components of the electronic module 100. For example, the other components may operate based on electrical power provided by the power unit 202 through a voltage bus or other connection. In some implementations, the power unit 202 includes a battery or a battery system, for example, a rechargeable battery. In some implementations, the power unit 1340 includes an adapter (e.g., an AC adapter) that receives an external power signal (from an external source) and coverts the external power signal to an internal power signal conditioned for a component of the electronic module 100. The power unit 202 may include other components or operate in another manner.

The example memory 204 and protected memory 207 may include computer-readable storage media, for example, a volatile memory device, a non-volatile memory device, or both. Each of the memory 204 and protected memory 207 may include one or more read-only memory devices, random-access memory devices, buffer memory devices, or a combination of these and other types of memory devices. In some instances, one or more components of the memory can be integrated or otherwise associated with another component of the electronic module 100. The memory 204 may store instructions that are executable by the processor 206, while protected memory 207 may store instructions that are executable by the cryptographic co-processor 208. For example, the instructions may include instructions to perform one or more of the operations shown in or described with respect to any of FIGS. 5-13, and 15.

The example processor 206 and cryptographic co-processor 208 can execute instructions, for example, to generate output data based on data inputs. The instructions can include programs, codes, scripts, modules, or other types of data. Additionally or alternatively, the instructions can be encoded as pre-programmed or re-programmable logic circuits, logic gates, or other types of hardware or firmware components or modules. Each of the processor 206 and the cryptographic co-processor 208 may be or include a general-purpose microprocessor, as a specialized co-processor or another type of data processing apparatus, with the cryptographic co-processor 208 being designated to perform cryptographic functions of the electronic module 100 (e.g., generate and store private keys, sign transactions, and perform encryption and decryption), and with the processor 206 being designated to perform other operations of the electronic module 100. For example, the processor 206 and the cryptographic co-processor 208 may be configured to execute or interpret software, scripts, programs, functions, executables, or other instructions stored in the memory 204 and the protected memory 207, respectively.

The example I/O circuitry 210 is configured to be a user interface and to move data into and out of the electronic module 100 and may include the wireless interface 212, the user interface 213, and the wired interface 214. In some implementations, the I/O circuitry 210 includes the screen 104, data port 108, microphone or speaker 110, camera 112A or 112B, or a combination thereof. The example wireless interface 212 may allow the electronic module 100 to operate according to a wireless network standard or another type of wireless communication protocol. For example, the wireless interface 212 allows the electronic module 100 to operate in a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., peer-to-peer communication standards such as Bluetooth, Bluetooth Low Energy, Near Field Communication (NFC), ZigBee, or the like), millimeter wave communications, and others. As a further example, the wireless interface 212 may allow the electronic module 100 to operate according to a cellular network standard, examples being 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others. Although the wireless interface 212 allows the electronic module 100 to operate according to the aforementioned examples, the wireless interface 212 can be programmed such that the electronic module 100 is prevented from connecting to a public network, thus maintaining the electronic module 100 as a cold device and preventing an adversary (e.g., a hacker) from gaining access to the contents of the electronic module 100. Example public networks include the Internet, a distributed ledger network (e.g., a Blockchain network), a cellular network, or other types of public messaging channels. As discussed in further detail below, the electronic module 100 communicates (e.g., with another electronic module) through intermediate communication gateways such as network-connected devices that are communicatively coupled to a public network. The example wired interface 214 allows the electronic module 100 to move data into and out of the electronic module 100 using a wired communication protocol (e.g., USB, Ethernet, FireWire, Lightning, or the like).

Figure 3:
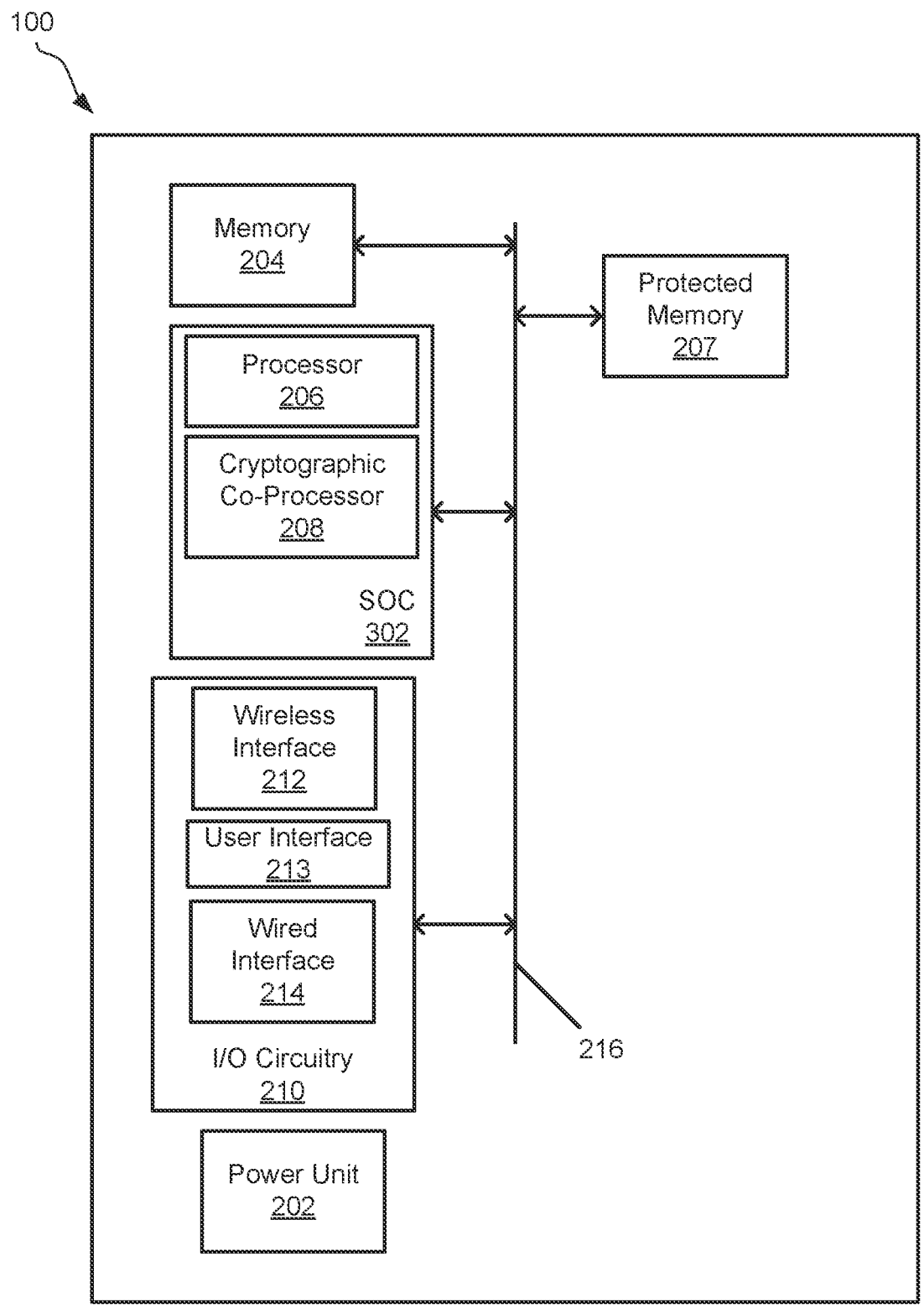

FIG. 3 is a block diagram showing another example of the electronic module 100. In the example of FIG. 3, the cryptographic co-processor 208 and the processor 206 are implemented as a system on chip (SOC) 302 that includes at least two general processors. One general processor may be designated to be the cryptographic co-processor 208 that performs cryptographic functions of the electronic module 100 (e.g., generate and store private keys, sign transactions, and perform encryption and decryption). Another general processor may be designated to be the processor 206 that performs other operations of the electronic module 100.

Figure 4:
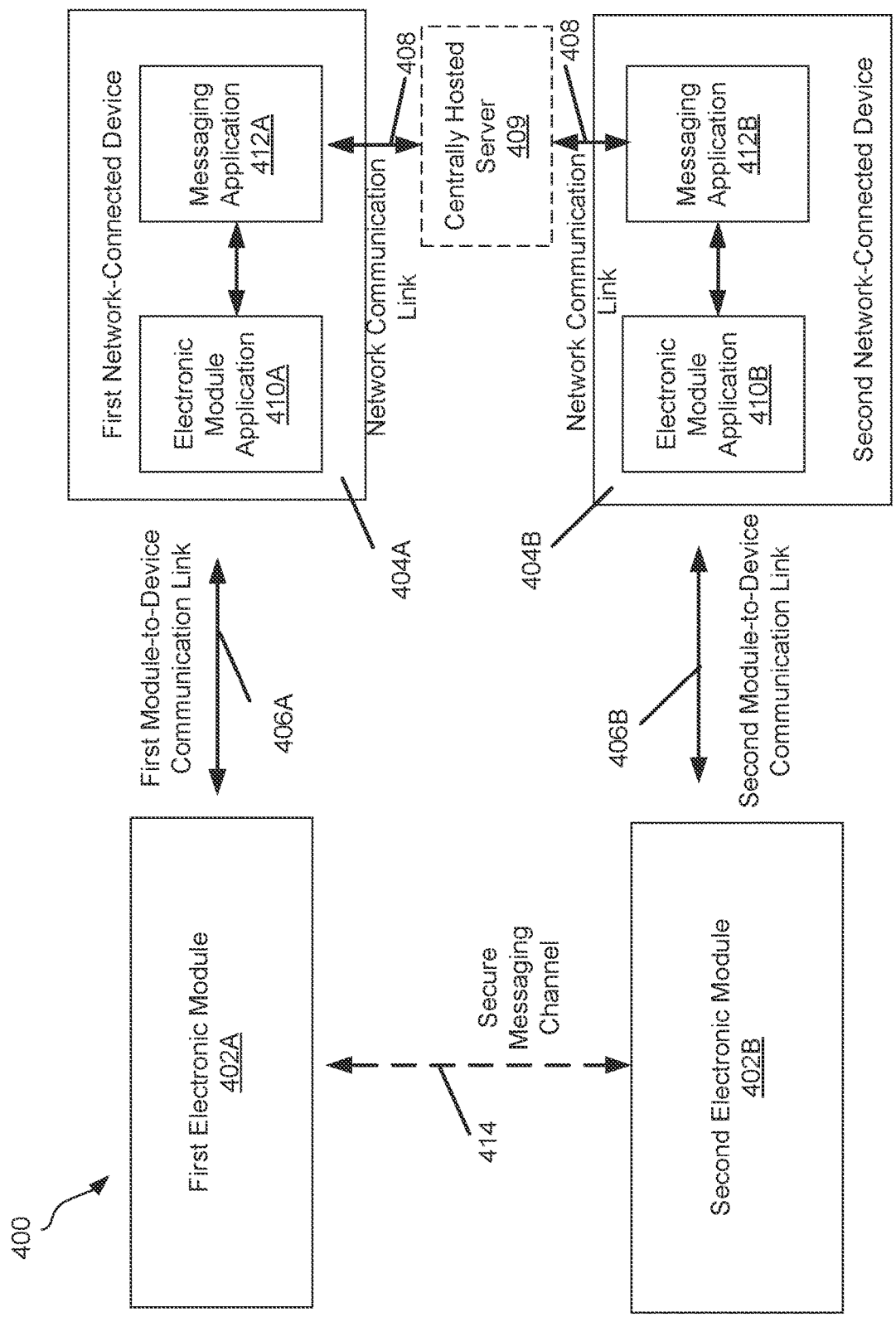
FIG. 4 illustrates an example system of connected entities including electronic modules and network-connected devices.

FIG. 4 illustrates an example system 400 of connected entities including electronic modules 402A, 402B and network-connected devices 404A, 404B. The example system 400 includes a first electronic module 402A, a second electronic module 402A, a first network-connected device 404A, and a second network-connected device 404B. In some implementations, each of the modules 402A, 402B may be identified with a respective electronic module 100 having components shown in FIGS. 1A, 1B, 2, and 3. Consequently, each of the electronic modules 402A, 402B can be a cold hardware wallet. The network-connected devices 404A, 404B may be any device that communicates in a wired or wireless communication network. In some implementations, each of the network-connected devices 404A, 404B may be a mobile device (e.g., a smartphone, a smart watch, a tablet, a laptop computer, a desktop computer, etc.), a wireless-enabled device (e.g., a smart thermostat, a Wi-Fi enabled camera, a smart TV), or another type of device that communicates in a wired or wireless network.

In the system 400, the electronic modules 402A, 402B exchange encrypted correspondence (e.g., encryption keys that are encrypted) to establish a secure messaging channel 414 between (e.g. directly between) the electronic modules 402A, 402B. In some implementations, the electronic modules 402A, 402B utilize the network-connected devices 404A, 404B as communication intermediaries or gateways to exchange encrypted correspondence to establish the secure messaging channel 414. In some instances, the secure messaging channel 414 includes the use of the network-connected devices 404A, 404B as communication intermediaries or gateways between the electronic modules 402A, 402B. In other instances, the secure messaging channel 414 may be a direct connection between the electronic modules 402A, 402B, and in such instances use of the network-connected devices 404A, 404B as communication intermediaries or gateways may be omitted. In such instances, the direct secure messaging channel 414 between the electronic modules 402A, 402B may include an out-of-band communication link. Example out-of-band communication links include an air-gapped communication link (e.g., a quick response (QR) code), Bluetooth, Bluetooth Low Energy, Near Field Communication, WiFi, a side load communications link (e.g., SD card, memory stick), a wired communication link (e.g., USB), among others. As an example, the electronic modules 402A, 402B can be directly connected to each other using the out-of-band communication link when they are in close proximity to each other. In some instances, the out-of-band communication link may be temporary (e.g., lasting only as long as the electronic modules 402A, 402B are in close proximity to each other). In such instances, the electronic modules 402A, 402B can then utilize the network-connected devices 404A, 404B as communication intermediaries or gateways to exchange encrypted correspondence to reestablish the secure messaging channel 414. After establishing the secure messaging channel 414, the electronic modules 402A, 402B may communicate securely with each other. Although, in some instances, the network-connected devices 404A, 404B may be used by the electronic modules 402A, 402B as intermediaries to communicate over a public network, all plain text information such as text messages, photos, data files are entered directly into the electronic modules and securely encrypted before transmitting over a public network via the communication intermediaries or gateways. Furthermore, only the intended recipient electronic module(s) can decrypt the encrypted data transmitted over the public network and display the plaintext information. Consequently, all data is encrypted and decrypted on the electronic modules 402A, 402B, independent of the network-connected devices 404A, 404B or centrally hosted servers. As an example, images, video or audio recordings, documents, text messages, or any other information may be inputted into one of the electronic modules 402A, 402B (e.g., via its I/O circuitry 210), encrypted by that electronic module, and securely shared with the other of the electronic modules 402A, 402B via the secure messaging channel 414. In some implementations, after establishment of the secure messaging channel 414, the electronic modules 402A, 402B may continue using open messaging platforms (e.g., third party messaging channels that use intermediaries) to communicate with each other since messages exchanged between the electronic modules 402A, 402B are encrypted and readable only on the electronic modules 402A, 402B. Examples of open messaging platforms that may be used include Whatsapp, Telegram, Signal, SnapChat, Messenger, Facebook messaging, iMessage, SMS, e-mail, etc. In some implementations, users of the electronic modules 402A, 402B may be able to decide (e.g. via a user input to the electronic modules 402A, 402B) whether messages are to be shared with each other using the secure messaging channel 414 or the open messaging platforms.

In some implementations, a portion of the secure messaging channel 414 may include a network communication link configured to operate according to a wireless network standard (e.g., described above in reference to wireless interface 212), a cellular network standard (e.g., also described above in reference to wireless interface 212), a wired communication protocol (e.g., described above in reference to wired interface 214), an internet protocol, or a combination thereof. In some implementations, the network communication link may be configured to operate according to a blockchain-based infrastructure or any other distributed ledger network.

In some implementations, the first electronic module 402A and the first network-connected device 404A are communicatively coupled by a first module-to-device communication link 406A, while the second electronic module 402B and the second network-connected device 404B are communicatively coupled by a second module-to-device communication link 406B. In some implementations, the module-to-device communication links 406A, 406B may be configured to operate according to a wireless network standard or another type of wireless communication protocol. For example, the first electronic module 402A and the first network-connected device 404A (as well as the second electronic module 402B and the second network-connected device 404B) may be configured to operate as a WLAN, a PAN, a MAN, or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., peer-to-peer communication standards such as Bluetooth, Bluetooth Low Energy, Near Field Communication (NFC), ZigBee, or the like), millimeter wave communications, and others. In some implementations, the module-to-device communication links 406A, 406B may be configured to operate according to a wired communication protocol (e.g., USB, Ethernet, FireWire, Lightning, or the like).

In some implementations, the network-connected devices 404A, 404B are communicatively coupled by a network communication link 408 to a public network. In some instances, the network communication link 408 may be configured to operate according to a wireless network standard (e.g., described above in reference to wireless interface 212), a cellular network standard (e.g., also described above in reference to wireless interface 212), a wired communication protocol (e.g., described above in reference to wired interface 214), an internet protocol, or a combination thereof. In some implementations, the network communication link 408 may be mediated through a centrally hosted server 409 of a public network. In contrast to the network communication link 408 (which connects to a public network), the first module-to-device communication link 406A is a private module-to-device communication link between the first electronic module 402A and the first network-connected device 404A, while the second module-to-device communication link 406B is a private module-to-device communication link between the second electronic module 402B and the second network-connected device 404B.

In some implementations, the first network-connected device 404A includes an electronic module application 410A that may be launched by a user of the first network-connected device 404A. Once launched, the electronic module application 410A may allow the user to establish the first module-to-device communication link 406A between the first network-connected device 404A and the first electronic module 402A (e.g., the I/O circuitry 210 of the first electronic module 402A). Stated differently, the electronic module application 410A pairs the first network-connected device 404A and the first electronic module 402A to each other via the first module-to-device communication link 406A.

In a similar manner, in some implementations, the second network-connected device 404B includes an electronic module application 410B that may be launched by a user of the second network-connected device 404B. Once launched, the electronic module application 410B may allow the user to establish the second module-to-device communication link 406B between the second network-connected device 404B and the second electronic module 402B (e.g., the I/O circuitry 210 of the second electronic module 402B). Stated differently, the electronic module application 410B pairs the second network-connected device 404B and the second electronic module 402B to each other via the second module-to-device communication link 406B.

In some implementations, the network-connected devices 404A, 404B may respectively include messaging applications 412A, 412B that may be launched by users of the first network-connected device 404A and the second network-connected device 404B, respectively. The messaging applications 412A, 412B may include the Whatsapp messaging application, the Telegram messaging application, the Signal messaging application, the SnapChat messaging application, the Messenger messaging application, the Facebook messaging application, the iMessage messaging application, SMS, e-mail, a proprietary messaging application, or other messaging applications (e.g., see discussion below regarding the use of the Bitcoin blockchain as a messaging application). In some implementations, the messaging applications 412A, 412B generate messages that are exchanged through the centrally hosted server 409, thus allowing the network-connected devices 404A, 404B to communicate with each other using the network communication link 408.

An example messaging application 412A, 412B that can be used is the Bitcoin blockchain. Bitcoin allows various ways for inserting data into a transaction and displaying and storing that data permanently on a blockchain. As an example, Bitcoin offers an 'OP_RETURN' field, which is analogous to writing a memo on a transaction. In some implementations, a message (e.g., an encrypted message) on the blockchain may be posted by sending a transaction with the 'OP_RETURN' field containing the message to the intended recipient of the message. If the transaction is sent by a network-connected device to itself, other network-connected devices may need a block explorer to search for the message, which can include a unique identifier for searching. In some implementations, encryption/decryption key exchange can take place over the Bitcoin network using the 'OP_RETURN' field. For example, the encryption/decryption key may be message included in the 'OP_RETURN' field of a transaction. This can become a decentralized messaging platform (or decentralized encrypted twitter), with only encrypted data being shared publicly. In this example, the network-connected devices 404A, 404B construct an actual crypto-transaction to send the message (e.g., the encryption/decryption key). As another example, besides using the OP_RETURN field, data (e.g., text, images, audio files, video files, etc.) can be inserted into a Bitcoin transaction and stored on the Bitcoin blockchain by one or more of the following ways: using a Pay-to-Fake-Key-Hash (P2FKH), which embeds the data as a fake public key hash in the <PubKeyHash> field of the output script; using a Pay-to-Fake-Key (P2FK), which embeds the data as a fake, unhashed, public key; using a Pay-to-Fake-Multisig (P2FMS), where a real public key is used along with one or more fake keys containing the data; using a data drop method; and using a data hash method. Other cryptocurrencies such as Ethereum, Litecoin, Bitcoin Cash, and Dash offer a data field similar to OP_RETURN, as well as analogous methods for attaching various forms of data to their respective blockchains.

Figure 5:
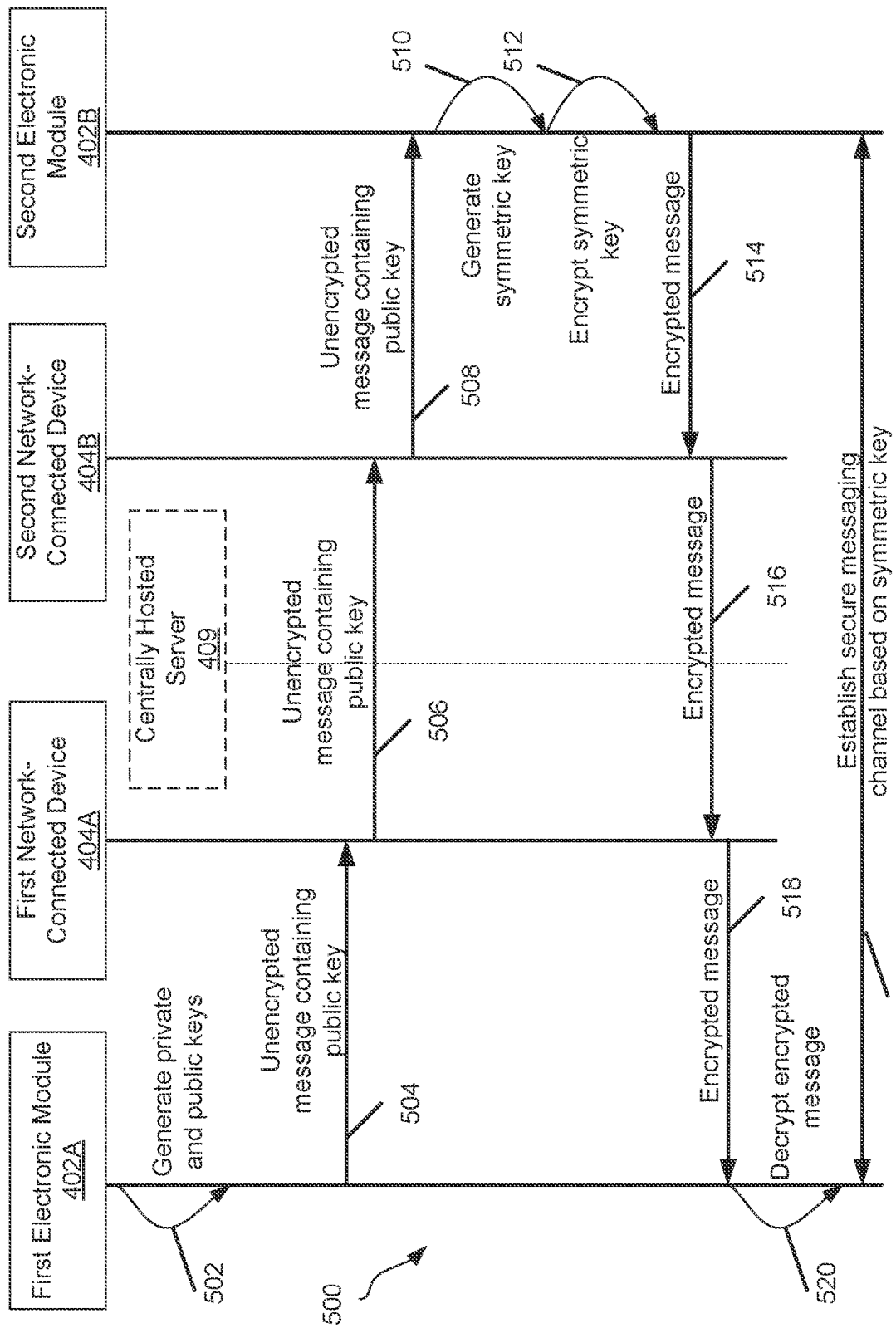
FIG. 5 shows an example sequence diagram illustrating a key sharing process that facilitates establishment of a secure messaging channel between a first electronic module and a second electronic module.

FIG. 5 shows an example sequence diagram 500 illustrating a key sharing process that facilitates the establishment of the secure messaging channel 414 between the first electronic module 402A and the second electronic module 402B. In some instances of the example shown in FIG. 5, a shared encryption key is securely exchanged between the electronic modules 402A, 402B using key sharing processes such as Diffie-Hellman. In some implementations, the key sharing process shown in FIG. 5 may be a symmetric key sharing process employing a Double Ratchet Algorithm or forward secrecy (e.g., where session keys are temporary or single-use and change from one session to the next). In step 502, the first electronic module 402A (e.g., the cryptographic co-processor 208 of the first electronic module 402A) generates a private key and a public key associated with the private key (e.g., a private/public key pair). In some implementations, the private and public keys may be stored in the protected memory 207 of the first electronic module 402A.

In step 504, the first electronic module 402A communicates an unencrypted message containing the public key to the first network-connected device 404A using the first module-to-device communication link 406A. In some implementations, the public key is retrieved from the protected memory 207 of the first electronic module 402A by the cryptographic co-processor 208 and provided to the one or more busses 206. By operation of one or more components in the unsecured region 218 of the first electronic module 402A (e.g., memory 204, processor 206, I/O circuitry 210), the public key is subsequently communicated to the first network-connected device 404A using the first module-to-device communication link 406A. In some implementations, the unencrypted message is received on the electronic module application 410A running on the first network-connected device 404A.

In step 506, the first network-connected device 404A relays the unencrypted message to the second network-connected device 404B using the network communication link 208. In some implementations, the unencrypted message is relayed by the messaging application 412A running on the first network-connected device 404A. The second network-connected device 404B may receive the unencrypted message on the messaging application 412B running on the second network-connected device 404B. In implementations where the network communication link 208 is mediated through the centrally hosted server 409, a third party (e.g., an adversary), eavesdropping at the centrally hosted server 409, may have access to the public key included in the unencrypted message. However, without access to the private key (e.g., stored in the protected memory 207 of the first electronic module 402A), knowledge of the public key by such a third party does not compromise the security of the first electronic module 402A or the second electronic module 402B.

In step 508, the second network-connected device 404B relays the unencrypted message to the second electronic module 404B using the second module-to-device communication link 406B. In some implementations, the unencrypted message is relayed by the messaging application 412B running on the second network-connected device 404B. The second electronic module 402B receives the unencrypted message, thereby making the public key available to the second electronic module 402B. In some implementations, the public key may be stored in the memory 204 of the second electronic module 402B.

In step 510, in response to receiving the unencrypted message, the second electronic module 402B (e.g., the cryptographic co-processor 208 of the second electronic module 402B) generates a symmetric encryption key. In some implementations, the symmetric encryption key may be stored in the protected memory 207 of the second electronic module 402B.

In step 512, the second electronic module 402B uses the public key to encrypt the symmetric encryption key, thereby generating an encrypted message. In some implementations, the symmetric encryption key may be encrypted using the cryptographic co-processor 208 of the second electronic module 402B. The encrypted message may be stored in the protected memory 207 of the second electronic module 402B.

In step 514, the encrypted message is communicated to the second network-connected device 404B using the second module-to-device communication link 406B. In some implementations, the encrypted message is retrieved from the protected memory 207 of the second network-connected device 404B by the cryptographic co-processor 208 and provided to the one or more busses 206. By operation of one or more components in the unsecured region 218 of the second electronic module 402B (e.g., memory 204, processor 206, I/O circuitry 210), the encrypted message is subsequently communicated to the second network-connected device 404B using the second module-to-device communication link 406B. In some implementations, the encrypted message is received on the electronic module application 410B running on the second network-connected device 404B.

In step 516, the second network-connected device 404B relays the encrypted message to the first network-connected device 404A using the network communication link 408. In some implementations, the encrypted message is relayed by the messaging application 412B running on the second network-connected device 404B. The first network-connected device 404A may receive the encrypted message on the messaging application 412A running on the first network-connected device 404A. In implementations where the network communication link 208 is mediated through the centrally hosted server 409, a third party, eavesdropping at the centrally hosted server 409, may have access to the encrypted message. However, without access to the private key (e.g., stored in the protected memory 207 of the first electronic module 402A), the third party cannot decrypt the encrypted message to gain access to the symmetric encryption key. Therefore, knowledge of the encrypted message by such a third party does not compromise the security of the first electronic module 402A or the second electronic module 402B.

In step 518, the first network-connected device 404A relays the encrypted message to the first electronic module 402A using the first module-to-device communication link 406A. In some implementations, the encrypted message is relayed by the messaging application 412A running on the first network-connected device 404A. The encrypted message may be received at the I/O circuitry 210 of the first electronic module 402A. By operation of one or more components in the unsecured region 218 of the first electronic module 402A (e.g., memory 204, processor 206, I/O circuitry 210), the encrypted message is subsequently provided to the cryptographic co-processor 208 of the first electronic module 402A.

In step 520, in response to receiving the encrypted message, the first electronic module 402A decrypts the encrypted message using the private key (e.g., stored in the protected memory 207 of the first electronic module 402A). In some implementations, the encrypted message may be decrypted using the cryptographic co-processor 208 of the first electronic module 402A. Decrypting the encrypted message makes the symmetric encryption key available to the first electronic module 402A. The symmetric encryption key may be stored in the protected memory 207 of the first electronic module 402A. After step 520, the symmetric encryption key is available for use by both the first electronic module 402A and the second electronic module 402B.

In step 522, a secure messaging channel is established between the first electronic module 402A and the second electronic module 402B based on at least the symmetric encryption key. In so doing, secure messages (e.g., encrypted and decrypted using the symmetric encryption key) may be shared between the first electronic module 402A and the second electronic module 402B without use of the network-connected devices 404A, 404B as intermediaries and without the use of a central authority (e.g., the centrally hosted server 409) to manage the encryption and decryption of messages exchanged between the electronic modules 402A, 402B. In some implementations, after the secure messaging channel 414 is established, the first electronic module 402A may delete the private and public keys stored therein, while the second electronic module 402B may delete the public key stored therein. As described above, in some implementations, after establishment of the secure messaging channel 414, the electronic modules 402A, 402B may continue using open messaging platforms (e.g., third party messaging channels that use intermediaries) to communicate with each other since messages exchanged between the electronic modules 402A, 402B are encrypted and readable only on the electronic modules 402A, 402B.

Users of the electronic modules 402A, 402B may be able to decide (e.g. via a user input to the electronic modules 402A, 402B) whether messages are to be shared with each other using the secure messaging channel 414 or the open messaging platforms.

As described above, secure messages may be shared between the first electronic module 402A and the second electronic module 402B using the secure messaging channel 414. In some implementations, symmetric encryption key extensions may allow a user to configure various settings related to the secure messages sent from one electronic module to another electronic module. For example, a user may select a duration of time during which a secure message may be viewed or accessed on the other electronic module (e.g., the receiving electronic module). After the duration of time has elapsed, the message may no longer be accessible on the other electronic module. As another example, a user may select the number of times a secure message may be viewed or accessed on the other electronic module (e.g., the receiving electronic module). In some implementations, a user may manage rights to a secure message by stipulating whether the secure message can be viewed on the other electronic module (e.g., the receiving electronic module) or copied from the other electronic module to an external or peripheral device (e.g., via the I/O circuitry 210).

Figure 6:
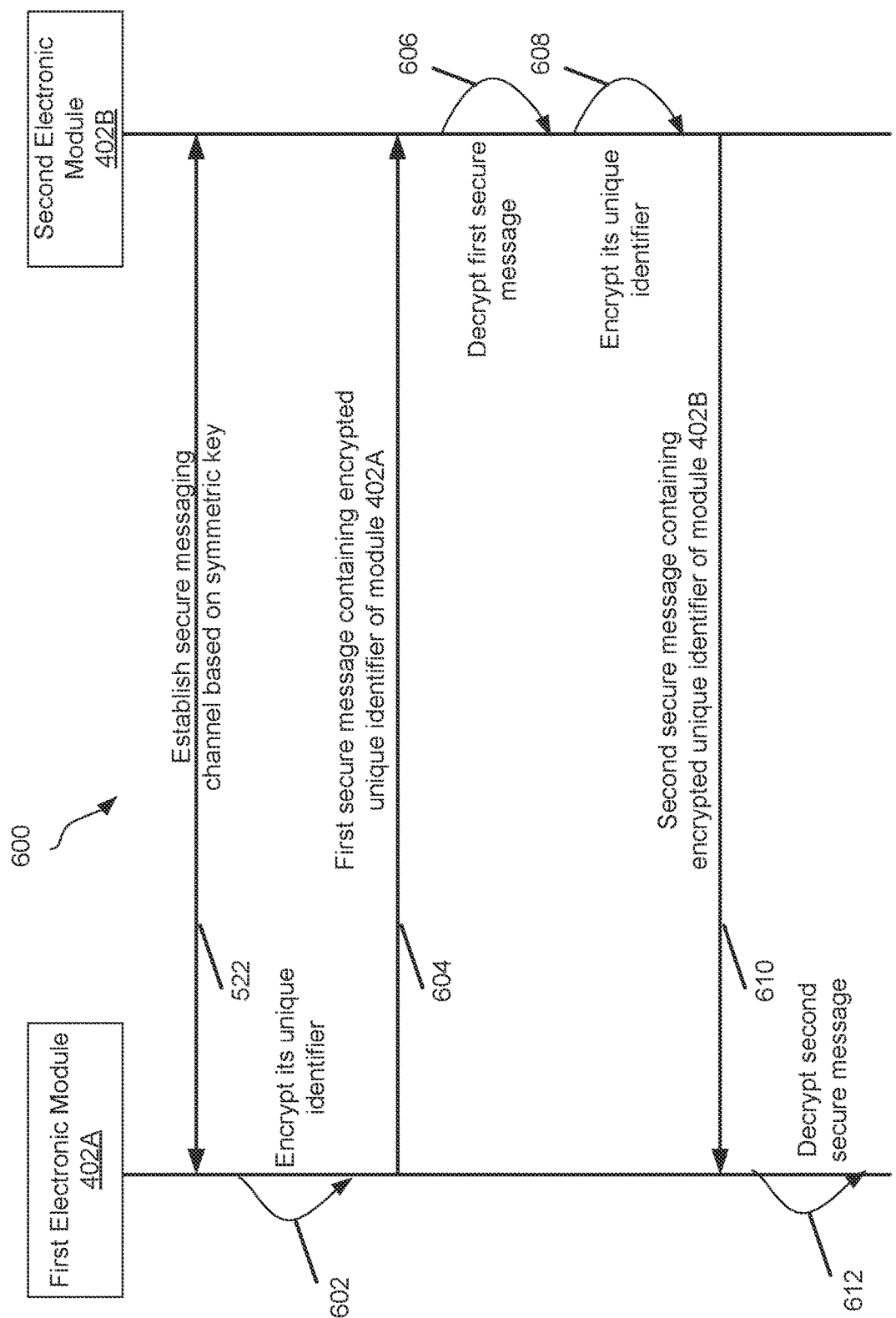
FIG. 6 shows an example sequence diagram illustrating a process where a first electronic module and a second electronic module share their unique identifiers with each other after establishment of a secure messaging channel.

In some implementations, after the secure messaging channel 414 is established, the first electronic module 402A and the second electronic module 402B may share their respective unique identifiers with each other using the secure messaging channel 414. However, in other implementations, unique identifiers do not need to be exchanged between the first and second electronic modules 402A, 402B or may be exchanged using a communication link that is different from the secure messaging channel 414 (e.g., an out of band channel, an example being in-person sharing of the unique identifiers between users of the electronic modules 402A, 402B). FIG. 6 shows an example sequence diagram 600 illustrating a process where the first electronic module 402A and the second electronic module 402B share their unique identifiers with each other after establishment of the secure messaging channel.

In step 602, the first electronic module 402A (e.g., the cryptographic co-processor 208 of the first electronic module 402A) encrypts its unique identifier using the symmetric encryption key, thereby generating a first secure message. In step 604, the first secure message is communicated to the second electronic module 402B on the secure messaging channel 414. In step 606, in response to receiving the first secure message from the first electronic module 402A, the second electronic module 402B (e.g., the cryptographic co-processor 208 of the second electronic module 402B) may decrypt the first secure message using the symmetric encryption key, thereby making the unique identifier of the first electronic module 402A available to the second electronic module 402B. In some implementations, the unique identifier of the first electronic module 402A may be stored in the protected memory 207 of the second electronic module 402B. Since there isn't a central authority managing user identity or usernames, the unique identifier may be the only characteristic used to determine which electronic module a particular electronic module is communicating with. Therefore, by storing the unique identifier of the first electronic module 402A, the second electronic module 402B can ensure that it is communicating with the first electronic module 402A and only that module 402A. The second electronic module 402B may then create a detailed contact profile based on the unique identifier of the first electronic module 402A. Sharing of the unique identifier could be required to establish a secure messaging link, so that electronic modules 402A, 402B can ensure communication is happening with an authentic electronic module.

In step 608, the second electronic module 402B (e.g., the cryptographic co-processor 208 of the second electronic module 402B) encrypts its unique identifier using the symmetric encryption key, thereby generating a second secure message. In step 610, the second secure message is subsequently communicated to the first electronic module 402A on the secure messaging channel 414. In step 612, in response to receiving the second secure message from the second electronic module 402B, the first electronic module 402A (e.g., the cryptographic co-processor 208 of the second electronic module 402A) may decrypt the second secure message using the symmetric encryption key, thereby making the unique identifier of the second electronic module 402B available to the first electronic module 402A. In some implementations, the unique identifier of the second electronic module 402B may be stored in the protected memory 207 of the first electronic module 402A. As described above, since there isn't a central authority managing user identity or usernames, the unique identifier may be the only characteristic used to determine which electronic module a particular electronic module is communicating with. Therefore, by storing the unique identifier of the second electronic module 402B, the first electronic module 402A can ensure that it is communicating with the second electronic module 402B and only that module 402B. The first electronic module 402A may then create a detailed contact profile based on the unique identifier of the second electronic module 402B. Sharing of the unique identifier could be required to establish a secure messaging link, so that electronic modules 402A, 402B can ensure communication is happening with an authentic electronic module.

In the example process 600, the first electronic module 402A provides its unique identifier to the second electronic module 402B before the second electronic module 402B provides its unique identifier to the first electronic module 402A. However, in other implementations, the unique identifier of the first electronic module 402A is provided to the second electronic module 402B after or simultaneously with the provision of the unique identifier of the second electronic module 402B to the first electronic module 402A.

Figure 7:
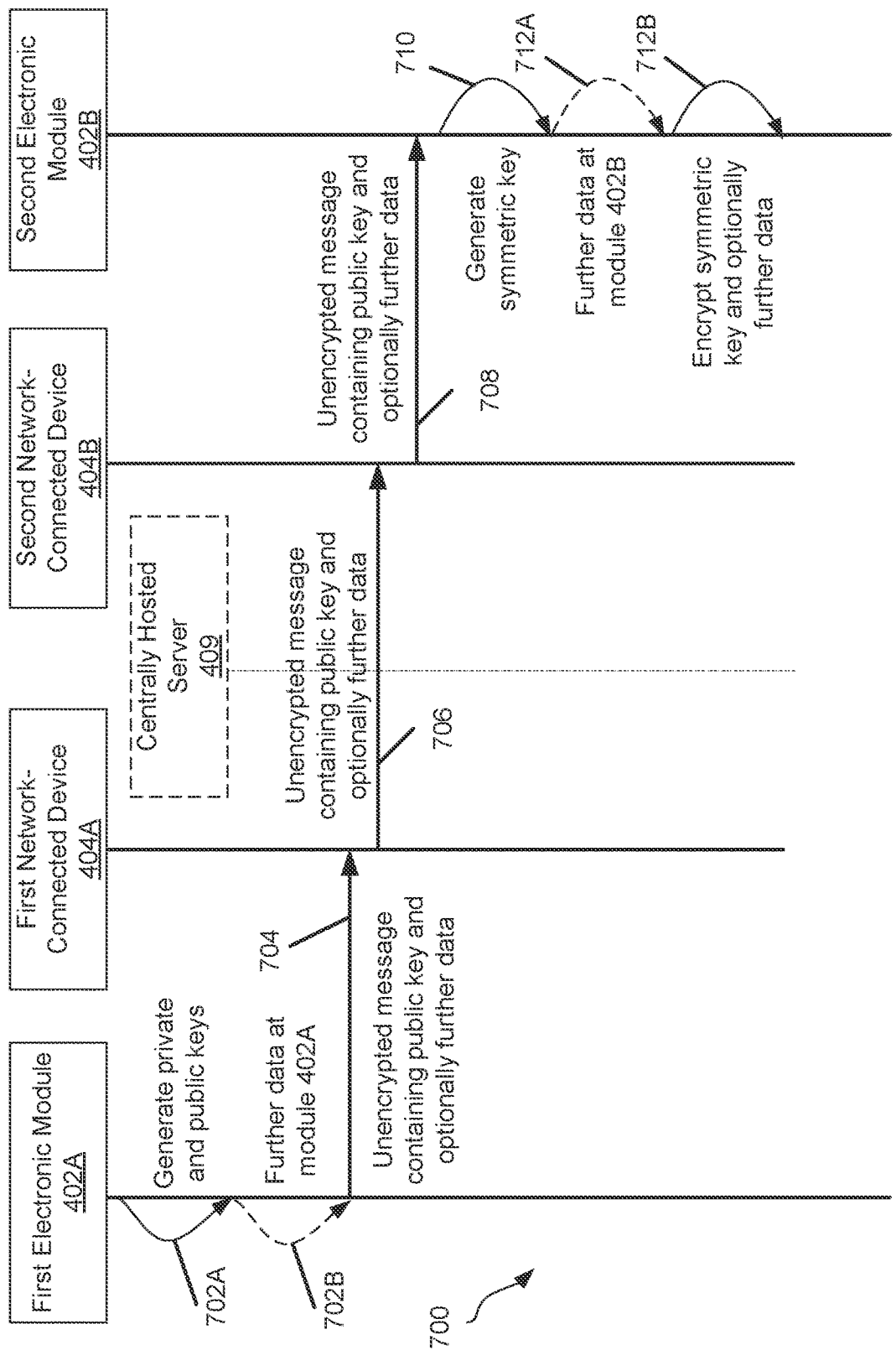
FIG. 7 shows an example sequence diagram illustrating a key sharing process that facilitates establishment of a secure messaging channel between a first electronic module and a second electronic module, where further data is included in an unencrypted message communicated by the first electronic module or in an encrypted message communicated by the second electronic module.

In the example process 500, the unencrypted message (e.g., communicated in step 504) includes the public key (e.g., generated in step 502). In other examples, further data may be included in the unencrypted message (e.g., in addition to the public key). Furthermore, in the example process 500, the encrypted message (e.g., communicated in step 514) includes an encrypted version of the symmetric key (e.g., generated in step 510). However, in other examples, further data may be included in the encrypted message (e.g., in addition to the encrypted version of the symmetric key). FIG. 7 shows an example sequence diagram 700 illustrating a key sharing process that facilitates the establishment of the secure messaging channel 414 between the first electronic module 402A and the second electronic module 402B, where further data is included in the unencrypted message communicated by the first electronic module 402A or in the encrypted message communicated by the second electronic module 402B. As in FIG. 5, in some implementations, the key sharing process shown in FIG. 7 may be a symmetric key sharing process employing a Double Ratchet Algorithm or forward secrecy (e.g., where session keys are temporary or single-use and change from one session to the next).

In step 702A, the first electronic module 402A generates a private key and a public key associated with the private key, as described above in step 502. In optional step 702B, further data is available at the first electronic module 402A. In some implementations, the further data may be the unique identifier of the first electronic module 402A or other information (e.g., images, video or audio recordings, documents, text messages, etc.) provided to the first electronic module 402A. In some implementations, the images, video or audio recordings, documents, text messages, or other types of information (e.g., a QR code) may be provided to the first electronic module 402A via the I/O circuitry 210 of the first electronic module 402A. As an example, the user of the first electronic module 402A may generate a video recording, an audio recording, an image, or an alphanumeric sequence using the screen 104, microphone 110, or camera 112A or 112B of the first electronic module. As another example, the user of the first electronic module 402A may connect an external or peripheral device (e.g., monitor, keyboard, printer, scanner, external memory, external camera, external voice recorder, etc.) to the first electronic module 402A (e.g., via the I/O circuitry 210) and transfer images, video or audio recordings, documents, text messages, or other types of information to the first electronic module 402A. In some implementations, the further data available at the first electronic module 402A is stored in the memory 204 of the first electronic module 402A.

In step 704, the first electronic module 402A communicates an unencrypted message containing the public key and the further data, if any, available at the first electronic module 402A to the first network-connected device 404A using the first module-to-device communication link 406A, as described above in step 504.

In step 706, the first network-connected device 404A relays the unencrypted message to the second network-connected device 404B using the network communication link 208, as described above in step 506. In implementations where the network communication link 208 is mediated through the centrally hosted server 409, a third party, eavesdropping at the centrally hosted server 409, may have access to the public key and the further data included in the unencrypted message. However, without access to the private key (e.g., stored in the protected memory 207 of the first electronic module 402A), knowledge of the public key and the further data by such a third party does not compromise the security of the first electronic module 402A or the second electronic module 402B.

In step 708, the second network-connected device 404B relays the unencrypted message to the second electronic module 404B using the second module-to-device communication link 406B, as described above in step 508. The second electronic module 402B receives the unencrypted message, thereby making the public key and the further data from the first electronic module 402A available to the second electronic module 402B. In some implementations, the public key and the further data from the first electronic module 402A may be stored in the memory 204 of the second electronic module 402B. In implementations where the further data includes the unique identifier of the first electronic module 402A, the unique identifier of the first electronic module 402A may be stored in the protected memory 207 of the second electronic module 402B. In some implementations, the further data from the first electronic module 402A may be stored in an external or peripheral device coupled to I/O circuitry 210 of the second electronic module 402A. In some examples, the further data from the first electronic module 402A may be displayed or played back at the second electronic module 402B. In some implementations, the further data from the first electronic module 402A may be transferred by the second electronic module 402B to a cloud-based file storage service for encrypted storage thereon.

In step 710, in response to receiving the unencrypted message, the second electronic module 402B generates the symmetric encryption key, as described above in step 510. In optional step 712A, further data may be available at the second electronic module 402B. In some implementations, the further data may be the unique identifier of the second electronic module 402B or other information (e.g., images, video or audio recordings, documents, text messages, etc.) provided to the second electronic module 402B. In some implementations, the images, video or audio recordings, documents, text messages, or other types of information (e.g., a QR code) may be provided to the second electronic module 402B via the I/O circuitry 210 of the second electronic module 402B. As an example, the user of the second electronic module 402B may generate a video recording, an audio recording, an image, or an alphanumeric sequence using the screen 104, microphone 110, or camera 112A or 112B of the second electronic module 402B. As another example, the user of the second electronic module 402B may connect an external or peripheral device (e.g., printer, scanner, external memory, external camera, external voice recorder, etc.) to the second electronic module 402B (e.g., via the I/O circuitry 210) and transfer images, video or audio recordings, documents, text messages, or other types of information to the second electronic module 402B. In some implementations, the further data available at the second electronic module 402B is stored in the memory 204 of the second electronic module 402B.

In step 712B, the second electronic module 402B uses the public key to encrypt the symmetric encryption key and the further data, if any, available at the second electronic module 402B, thereby generating an encrypted message, as described above in step 512. In some implementations, a Double Ratchet Algorithm or forward secrecy (e.g., where session keys are temporary or single-use and change from one session to the next) may also be employed. In step 714, the encrypted message is communicated to the second network-connected device 404B using the second module-to-device communication link 406B, as described above in step 514.

In step 716, the second network-connected device 404B relays the encrypted message to the first network-connected device 404A using the network communication link 408, as described above in step 516. In implementations where the network communication link 208 is mediated through the centrally hosted server 409, a third party, eavesdropping at the centrally hosted server 409, may have access to the encrypted message. However, without access to the private key (e.g., stored in the protected memory 207 of the first electronic module 402A), the third party cannot decrypt the encrypted message to gain access to the symmetric encryption key and the further data from the second electronic module 402B. Furthermore, if third party platforms are used for further messaging beyond sharing of the encryption keys, the third party will only have access to encrypted data, which can only be decrypted on the electronic module. Therefore, knowledge of the encrypted message by such a third party does not compromise the security of the first electronic module 402A or the second electronic module 402B.

In step 718, the first network-connected device 404A relays the encrypted message to the first electronic module 402A using the first module-to-device communication link 406A, as described above in step 518. In step 720, in response to receiving the encrypted message, the first electronic module 402A decrypts the encrypted message using the private key (e.g., stored in the protected memory 207 of the first electronic module 402A), as described above in step 520. Decrypting the encrypted message makes the symmetric encryption key and the further data from the second electronic module 402B available to the first electronic module 402A. In some implementations, the further data from the second electronic module 402B may be stored in the memory 204 of the first electronic module 402A. In implementations where the further data from the second electronic module 402B includes the unique identifier of the second electronic module 402B, the unique identifier of the second electronic module 402B may be stored in the protected memory 207 of the first electronic module 402A. In some implementations, the further data from the second electronic module 402B may be stored in an external or peripheral device coupled to I/O circuitry 210 of the first electronic module 402A. In some examples, the further data from the second electronic module 402B may be displayed or played back at the first electronic module 402A. In some implementations, the further data from the second electronic module 402B may be transferred by the first electronic module 402A to a cloud-based file storage service for encrypted storage thereon. After step 720, the symmetric encryption key is available for use by both the first electronic module 402A and the second electronic module 402B.

In step 722, a secure messaging channel is established between the first electronic module 402A and the second electronic module 402B based on at least the symmetric encryption key, as described above in step 522. In so doing, secure messages (e.g., encrypted and decrypted using the symmetric encryption key) may be shared between the first electronic module 402A and the second electronic module 402B without use of the network-connected devices 404A, 404B as intermediaries and without the use of a central authority (e.g., the centrally hosted server 409) to manage the encryption and decryption of messages exchanged between the electronic modules 402A, 402B. In some implementations, after the secure messaging channel 414 is established, the first electronic module 402A may delete the private and public keys stored therein, while the second electronic module 402B may delete the public key stored therein.

Figure 8:
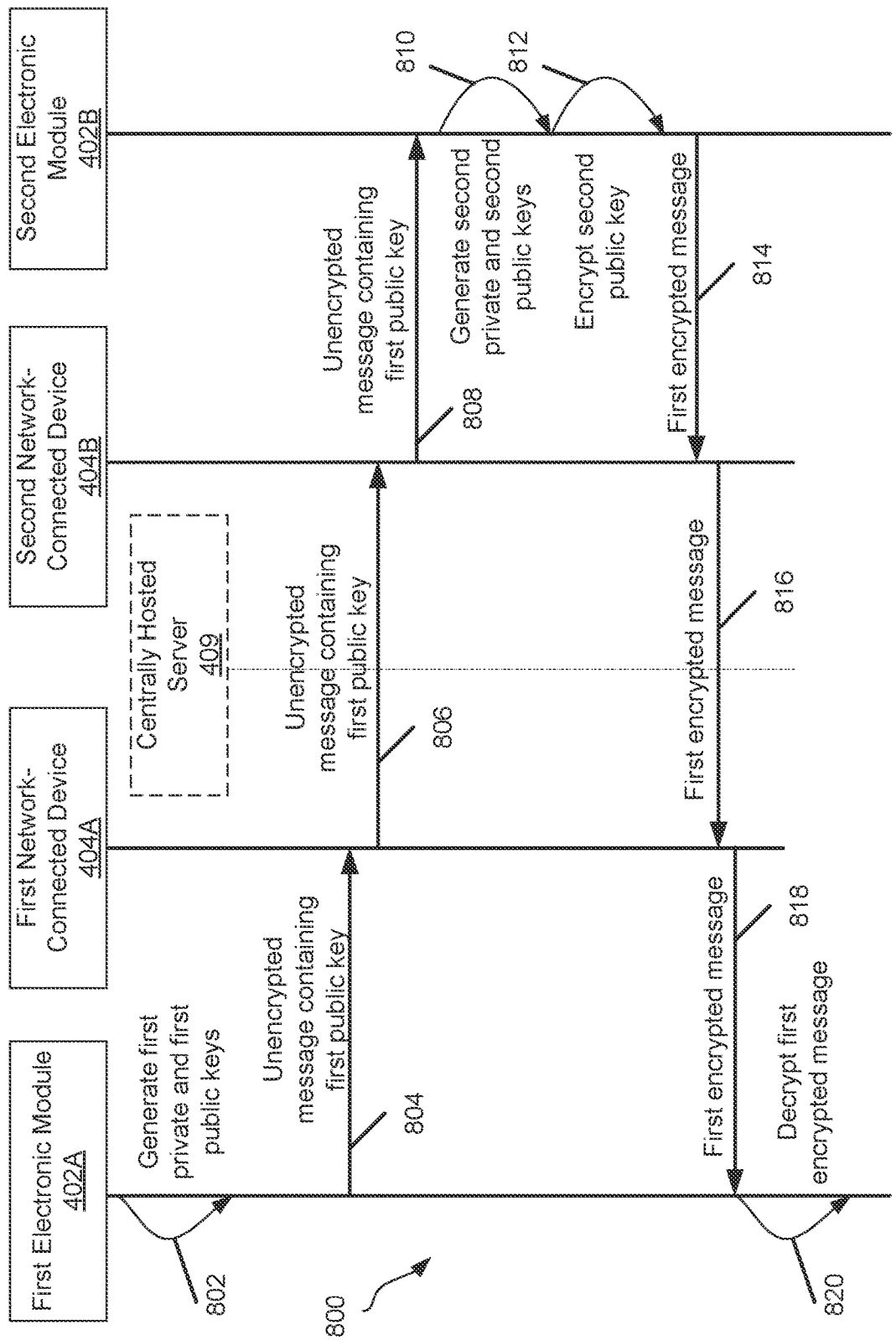
FIG. 8 shows an example sequence diagram illustrating a key sharing process that facilitates establishment of a secure messaging channel between a first electronic module and a second electronic module.

The sequence diagrams shown in the examples of FIGS. 5 and 7 illustrate key sharing processes that may be symmetric key sharing process employing a Double Ratchet Algorithm or forward secrecy. In some implementations, an asymmetric key sharing process may be executed by the first electronic module 402A and the second electronic module 402B. FIG. 8 shows an example sequence diagram 800 illustrating an asymmetric key sharing process that facilitates the establishment of the secure messaging channel 414 between the first electronic module 402A and the second electronic module 402B.

In step 802, the first electronic module 402A (e.g., the cryptographic co-processor 208 of the first electronic module 402A) generates a first private key and a first public key associated with the first private key. In some implementations, the first private and first public keys may be stored in the protected memory 207 of the first electronic module 402A.

In step 804, the first electronic module 402A communicates an unencrypted message containing the first public key to the first network-connected device 404A using the first module-to-device communication link 406A. In some implementations, the first public key is retrieved from the protected memory 207 of the first electronic module 402A by the cryptographic co-processor 208 and provided to the one or more busses 206. By operation of one or more components in the unsecured region 218 of the first electronic module 402A (e.g., memory 204, processor 206, I/O circuitry 210), the first public key is subsequently communicated to the first network-connected device 404A using the first module-to-device communication link 406A. In some implementations, the unencrypted message is received on the electronic module application 410A running on the first network-connected device 404A.

In step 806, the first network-connected device 404A relays the unencrypted message to the second network-connected device 404B using the network communication link 208. In some implementations, the unencrypted message is relayed by the messaging application 412A running on the first network-connected device 404A. The second network-connected device 404B may receive the unencrypted message on the messaging application 412B running on the second network-connected device 404B. In implementations where the network communication link 208 is mediated through the centrally hosted server 409, a third party, eavesdropping at the centrally hosted server 409, may have access to the first public key included in the unencrypted message. However, without access to the first private key (e.g., stored in the protected memory 207 of the first electronic module 402A), knowledge of the first public key by such a third party does not compromise the security of the first electronic module 402A or the second electronic module 402B.

In step 808, the second network-connected device 404B relays the unencrypted message to the second electronic module 402B using the second module-to-device communication link 406B. In some implementations, the unencrypted message is relayed by the messaging application 412B running on the second network-connected device 404B. The second electronic module 402B receives the unencrypted message, thereby making the first public key, generated by the first electronic module 402A, available to the second electronic module 402B. In some implementations, the first public key may be stored in the memory 204 of the second electronic module 402B. In some implementations, the first public key may be shared by the first electronic module 402A with the first network-connected device 404A, the second network-connected device 404B, or the second electronic module 402B using an out-of-band link (e.g. in person), thereby obviating one or more of steps 804, 806, 808.

In step 810, in response to receiving the unencrypted message, the second electronic module 402B (e.g., the cryptographic co-processor 208 of the second electronic module 402B) generates a second private key and a second public key associated with the second private key. In some implementations, the second private and second public keys may be stored in the protected memory 207 of the second electronic module 402B.

In step 812, the second electronic module 402B uses the first public key to encrypt the second public key, thereby generating a first encrypted message. In some implementations, the second public key may be encrypted using the cryptographic co-processor 208 of the second electronic module 402B. The first encrypted message may be stored in the protected memory 207 of the second electronic module 402B.

In step 814, the first encrypted message is communicated to the second network-connected device 404B using the second module-to-device communication link 406B. In some implementations, the first encrypted message is retrieved from the protected memory 207 of the second electronic module 402B by the cryptographic co-processor 208 and provided to the one or more busses 206. By operation of one or more components in the unsecured region 218 of the second electronic module 402B (e.g., memory 204, processor 206, I/O circuitry 210), the first encrypted message is subsequently communicated to the second network-connected device 404B using the second module-to-device communication link 406B. In some implementations, the first encrypted message is received on the electronic module application 410B running on the second network-connected device 404B.

In step 816, the second network-connected device 404B relays the first encrypted message to the first network-connected device 404A using the network communication link 408. In some implementations, the first encrypted message is relayed by the messaging application 412B running on the second network-connected device 404B. The first network-connected device 404A may receive the first encrypted message on the messaging application 412A running on the first network-connected device 404A. In implementations where the network communication link 208 is mediated through the centrally hosted server 409, a third party, eavesdropping at the centrally hosted server 409, may have access to the first encrypted message. However, without access to the first private key (e.g., stored in the protected memory 207 of the first electronic module 402B), the third party cannot decrypt the first encrypted message to gain access to the second public key. Therefore, knowledge of the first encrypted message by such a third party does not compromise the security of the first electronic module 402A or the second electronic module 402B.

In step 818, the first network-connected device 404A relays the first encrypted message to the first electronic module 402A using the first module-to-device communication link 406A. In some implementations, the first encrypted message is relayed by the messaging application 412A running on the first network-connected device 404A. The first encrypted message may be received at the I/O circuitry 210 of the first electronic module 402A. By operation of one or more components in the unsecured region 218 of the first electronic module 402A (e.g., memory 204, processor 206, I/O circuitry 210), the first encrypted message is subsequently provided to the cryptographic co-processor 208 of the first electronic module 402A.

In step 820, in response to receiving the first encrypted message, the first electronic module 402A decrypts the first encrypted message using the first private key (e.g., stored in the protected memory 207 of the first electronic module 402A). In some implementations, the first encrypted message may be decrypted using the cryptographic co-processor 208 of the first electronic module 402A. Decrypting the first encrypted message makes the second public key available to the first electronic module 402A. The second public key may be stored in the protected memory 207 or the memory 204 of the first electronic module 402A.

In step 822, the first electronic module 402A (e.g., the cryptographic co-processor 208 of the first electronic module 402A) generates a third private key and a third public key associated with the third private key. In some implementations, the third private and third public keys may be stored in the protected memory 207 of the first electronic module 402A.

In step 824, the first electronic module 402A uses the second public key (e.g., obtained in decryption step 820) to encrypt the third public key, thereby generating a second encrypted message. In some implementations, the third public key may be encrypted using the cryptographic co-processor 208 of the first electronic module 402A. The second encrypted message may be stored in the protected memory 207 of the first electronic module 402A.

In step 826, the first electronic module 402A communicates the second encrypted message to the first network-connected device 404A using the first module-to-device communication link 406A. In some implementations, the second encrypted message is retrieved from the protected memory 207 of the first electronic module 402A by the cryptographic co-processor 208 and provided to the one or more busses 206. By operation of one or more components in the unsecured region 218 of the first electronic module 402A (e.g., memory 204, processor 206, I/O circuitry 210), the second encrypted message is subsequently communicated to the first network-connected device 404A using the first module-to-device communication link 406A. In some implementations, the second encrypted message is received on the electronic module application 410A running on the first network-connected device 404A.

In step 828, the first network-connected device 404A relays the second encrypted message to the second network-connected device 404B using the network communication link 208. In some implementations, the second encrypted message is relayed by the messaging application 412A running on the first network-connected device 404A. The second network-connected device 404B may receive the second encrypted message on the messaging application 412B running on the second network-connected device 404B. In implementations where the network communication link 208 is mediated through the centrally hosted server 409, a third party, eavesdropping at the centrally hosted server 409, may have access to the second encrypted message. However, without access to the second private key (e.g., stored in the protected memory 207 of the second electronic module 402B), knowledge of the second encrypted message by such a third party does not compromise the security of the first electronic module 402A or the second electronic module 402B.

In step 830, the second network-connected device 404B relays the second encrypted message to the second electronic module 404B using the second module-to-device communication link 406B. In some implementations, the second encrypted message is relayed by the messaging application 412B running on the second network-connected device 404B. The second electronic module 402B receives the second encrypted message and may store the second encrypted message in the protected memory 207 or memory 204 of the second electronic module 402B.

In step 832, in response to receiving the second encrypted message, the second electronic module 402B decrypts the second encrypted message using the second private key (e.g., stored in the protected memory 207 of the second electronic module 402B). In some implementations, the second encrypted message may be decrypted using the cryptographic co-processor 208 of the second electronic module 402B. Decrypting the second encrypted message makes the third public key available to the second electronic module 402B. The third public key may be stored in the protected memory 207 or the memory 204 of the second electronic module 402B.

In step 834, a secure messaging channel is established between the first electronic module 402A and the second electronic module 402B based on at least the second and third public keys and the second and third private keys. As an example, in some implementations, messages from the first electronic module 402A to the second electronic module 402B are encrypted at the first electronic module 402A using the second public key and decrypted at the second electronic module 402B using the second private key. As another example, in some implementations, messages from the second electronic module 402B to the first electronic module 402A are encrypted at the second electronic module 402B using the third public key and decrypted at the first electronic module 402A using the third private key. In so doing, secure messages may be shared between the first electronic module 402A and the second electronic module 402B without use of the network-connected devices 404A, 404B as intermediaries and without the use of a central authority (e.g., the centrally hosted server 409) to manage the encryption and decryption of messages exchanged between the electronic modules 402A, 402B. As described above, in some implementations, after establishment of the secure messaging channel 414, the electronic modules 402A, 402B may continue using open messaging platforms (e.g., third party messaging channels that use intermediaries) to communicate with each other since messages exchanged between the electronic modules 402A, 402B are encrypted and readable only on the electronic modules 402A, 402B. Users of the electronic modules 402A, 402B may be able to decide (e.g. via a user input to the electronic modules 402A, 402B) whether messages are to be shared with each other using the secure messaging channel 414 or the open messaging platforms. In some implementations, after the secure messaging channel 414 is established, the first electronic module 402A may delete the first private and public keys stored therein, while the second electronic module 402B may delete the first public key stored therein. In some implementations, after the secure messaging channel 414 is established, the first electronic module 402A and the second electronic module 402B may share their respective unique identifiers with the other electronic module, as described above in reference to FIG. 6.

Figure 9:
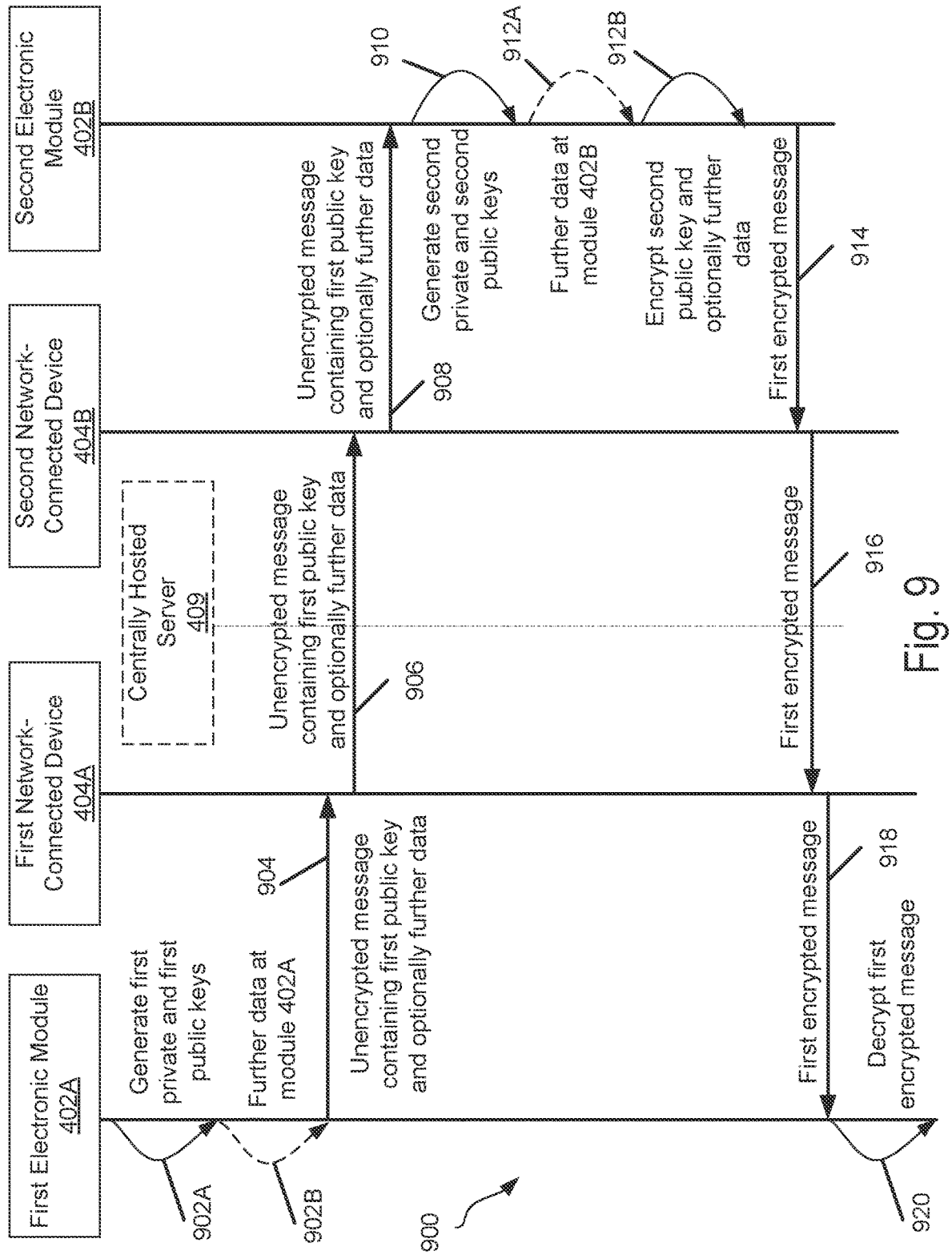
FIG. 9 shows an example sequence diagram illustrating a key sharing process that facilitates establishment of a secure messaging channel between a first electronic module and a second electronic module, where further data is included in an unencrypted message communicated by the first electronic module or in an encrypted message communicated by the second electronic module.

FIG. 9 shows an example sequence diagram 900 illustrating an asymmetric key sharing process that facilitates the establishment of the secure messaging channel 414 between the first electronic module 402A and the second electronic module 402B, where further data is included in the unencrypted message communicated by the first electronic module 402A or in the first encrypted message communicated by the second electronic module 402B.

In step 902A, the first electronic module 402A generates a first private key and a first public key associated with the first private key, as described above in step 802. In optional step 902B, further data is available at the first electronic module 402A, as described above in step 702B. In step 904, the first electronic module 402A communicates an unencrypted message containing the first public key and the further data, if any, available at the first electronic module 402A to the first network-connected device 404A using the first module-to-device communication link 406A. In some implementations, the first public key is retrieved from the protected memory 207 of the first electronic module 402A by the cryptographic co-processor 208 and provided to the one or more busses 206. By operation of one or more components in the unsecured region 218 of the first electronic module 402A (e.g., memory 204, processor 206, I/O circuitry 210), the first public key and optionally the further data from the first electronic module 402A are subsequently communicated to the first network-connected device 404A using the first module-to-device communication link 406A. In some implementations, the unencrypted message is received on the electronic module application 410A running on the first network-connected device 404A.

In step 906, the first network-connected device 404A relays the unencrypted message to the second network-connected device 404B using the network communication link 208, as described above in step 806. In implementations where the network communication link 208 is mediated through the centrally hosted server 409, a third party, eavesdropping at the centrally hosted server 409, may have access to the first public key and the further data included in the unencrypted message. However, without access to the first private key (e.g., stored in the protected memory 207 of the first electronic module 402A), knowledge of the first public key and the further data by such a third party does not compromise the security of the first electronic module 402A or the second electronic module 402B.

In step 908, the second network-connected device 404B relays the unencrypted message to the second electronic module 404B using the second module-to-device communication link 406B, as described above in step 808. The second electronic module 402B receives the unencrypted message, thereby making the first public key and the further data from the first electronic module 402A available to the second electronic module 402B. In some implementations, the first public key and the further data from the first electronic module 402A may be stored in the memory 204 of the second electronic module 402B. In implementations where the further data includes the unique identifier of the first electronic module 402A, the unique identifier of the first electronic module 402A may be stored in the protected memory 207 of the second electronic module 402B. In some implementations, the further data from the first electronic module 402A may be stored in an external or peripheral device coupled to I/O circuitry 210 of the second electronic module 402A. In some examples, the further data from the first electronic module 402A may be displayed or played back at the second electronic module 402B.

In step 910, in response to receiving the unencrypted message, the second electronic module 402B generates a second private key and a second public key associated with the second private key, as described above in step 810. In optional step 912A, further data may be available at the second electronic module 402B, as described above in step 712A. In step 912B, the second electronic module 402B uses the first public key to encrypt the second public key and optionally the further data from the second electronic module 402B, thereby generating a first encrypted message. The first encrypted message may be stored in the protected memory 207 of the second electronic module 402B.

In step 914, the first encrypted message is communicated to the second network-connected device 404B using the second module-to-device communication link 406B, as described above in step 814. In step 916, the second network-connected device 404B relays the first encrypted message to the first network-connected device 404A using the network communication link 408, as described above in step 816. In implementations where the network communication link 208 is mediated through the centrally hosted server 409, a third party, eavesdropping at the centrally hosted server 409, may have access to the first encrypted message. However, without access to the first private key (e.g., stored in the protected memory 207 of the first electronic module 402A), the third party cannot decrypt the first encrypted message to gain access to the second public key and the further data from the second electronic module 402B. Therefore, knowledge of the first encrypted message by such a third party does not compromise the security of the first electronic module 402A or the second electronic module 402B. In step 918, the first network-connected device 404A relays the first encrypted message to the first electronic module 402A using the first module-to-device communication link 406A, as described above in step 818.

In step 920, in response to receiving the first encrypted message, the first electronic module 402A decrypts the first encrypted message using the first private key (e.g., stored in the protected memory 207 of the first electronic module 402A), as described above in step 820. Decrypting the first encrypted message makes the second public key and the further data from the second electronic module 402B available to the first electronic module 402A. The second public key and the further data from the second electronic module 402B may be stored in the protected memory 207 or the memory 204 of the first electronic module 402A. In implementations where the further data from the second electronic module 402B includes the unique identifier of the second electronic module 402B, the unique identifier of the second electronic module 402B may be stored in the protected memory 207 of the first electronic module 402A. In some implementations, the further data from the second electronic module 402B may be stored in an external or peripheral device coupled to I/O circuitry 210 of the first electronic module 402A. In some examples, the further data from the second electronic module 402B may be displayed or played back at the first electronic module 402A.

In step 922, the first electronic module 402A generates a third private key and a third public key associated with the third private key, as described above in step 822. In step 924, the first electronic module 402A uses the second public key (e.g., obtained in decryption step 920) to encrypt the third public key, thereby generating a second encrypted message, as described above in step 824. In step 926, the first electronic module 402A communicates the second encrypted message to the first network-connected device 404A using the first module-to-device communication link 406A, as described above in step 826. In step 928, the first network-connected device 404A relays the second encrypted message to the second network-connected device 404B using the network communication link 208, as described above in step 828. In implementations where the network communication link 208 is mediated through the centrally hosted server 409, a third party, eavesdropping at the centrally hosted server 409, may have access to the second encrypted message. However, without access to the second private key (e.g., stored in the protected memory 207 of the second electronic module 402B), knowledge of the second encrypted message by such a third party does not compromise the security of the first electronic module 402A or the second electronic module 402B.

In step 930, the second network-connected device 404B relays the second encrypted message to the second electronic module 404B using the second module-to-device communication link 406B, as described above in step 830. In step 932, in response to receiving the second encrypted message, the second electronic module 402B decrypts the second encrypted message using the second private key (e.g., stored in the protected memory 207 of the second electronic module 402B), as described above in step 832. In step 934, a secure messaging channel is established between the first electronic module 402A and the second electronic module 402B based on at least the second and third public keys and the second and third private keys, as described above in step 834.

Figure 10:
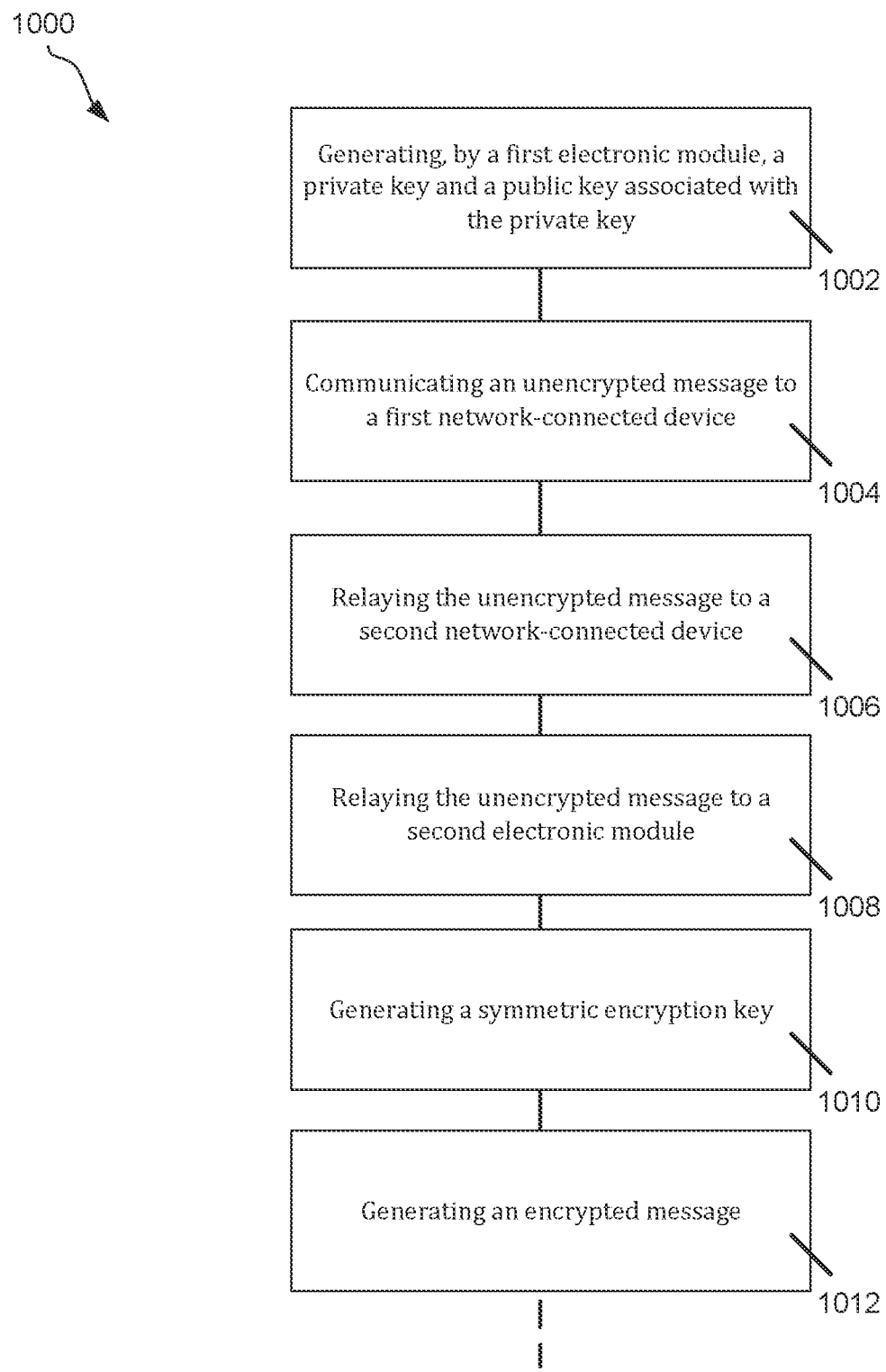
FIG. 10 is a flow diagram showing an example key sharing process performed by the system shown in FIG. 4.

FIG. 10 is a flow diagram showing an example key sharing process 1000 performed by the system shown in FIG. 4. Process 1000 includes operation 1002 of generating, by a first electronic module, a private key and a public key associated with the private key. Operation 1002 may, as an example, be identified with steps 502 and 702A shown in FIGS. 5 and 7, respectively.

Process 1000 includes operation 1004 of communicating, by the first electronic module, an unencrypted message, including the public key, to a first network-connected device using a first module-to-device communication link. Operation 1004 may, as an example, be identified with steps 504 and 704 shown in FIGS. 5 and 7, respectively.

Process 1000 includes operation 1006 of relaying, by the first network-connected device, the unencrypted message to a second network-connected device using a network communication link. Operation 1006 may, as an example, be identified with steps 506 and 706 shown in FIGS. 5 and 7, respectively.

Process 1000 includes operation 1008 of relaying, by the second network-connected device, the unencrypted message to a second electronic module using a second module-to-device communication link. Operation 1008 may, as an example, be identified with steps 508 and 708 shown in FIGS. 5 and 7, respectively.

Process 1000 includes operation 1010 of generating, by the second electronic module and in response to reception of the unencrypted message, a symmetric encryption key. Operation 1010 may, as an example, be identified with steps 510 and 710 shown in FIGS. 5 and 7, respectively.

Process 1000 includes operation 1012 of generating, by the second electronic module, an encrypted message by encrypting the symmetric encryption key using the public key. Operation 1012 may, as an example, be identified with steps 512 and 712B shown in FIGS. 5 and 7, respectively.

Process 1000 includes operation 1014 of communicating, by the second electronic module, the encrypted message to the second network-connected device using the second module-to-device communication link. Operation 1014 may, as an example, be identified with steps 514 and 714 shown in FIGS. 5 and 7, respectively.

Process 1000 includes operation 1016 of relaying, by the second network-connected device, the encrypted message to the first network-connected device using the network communication link. Operation 1016 may, as an example, be identified with steps 516 and 716 shown in FIGS. 5 and 7, respectively.

Process 1000 includes operation 1018 of relaying, by the first network-connected device, the encrypted message to the first electronic module using the first module-to-device communication link. Operation 1018 may, as an example, be identified with steps 518 and 718 shown in FIGS. 5 and 7, respectively.

Process 1000 includes operation 1020 of decrypting, by the first electronic module, the encrypted message using the private key, where decrypting using the private key makes the symmetric encryption key available to the first electronic module. Operation 1020 may, as an example, be identified with steps 520 and 720 shown in FIGS. 5 and 7, respectively.

Process 1000 includes operation 1022 of establishing a secure messaging channel, based on at least the symmetric encryption key, between the first electronic module and the second electronic module. Operation 1020 may, as an example, be identified with steps 520 and 720 shown in FIGS. 5 and 7, respectively.

Figure 11:
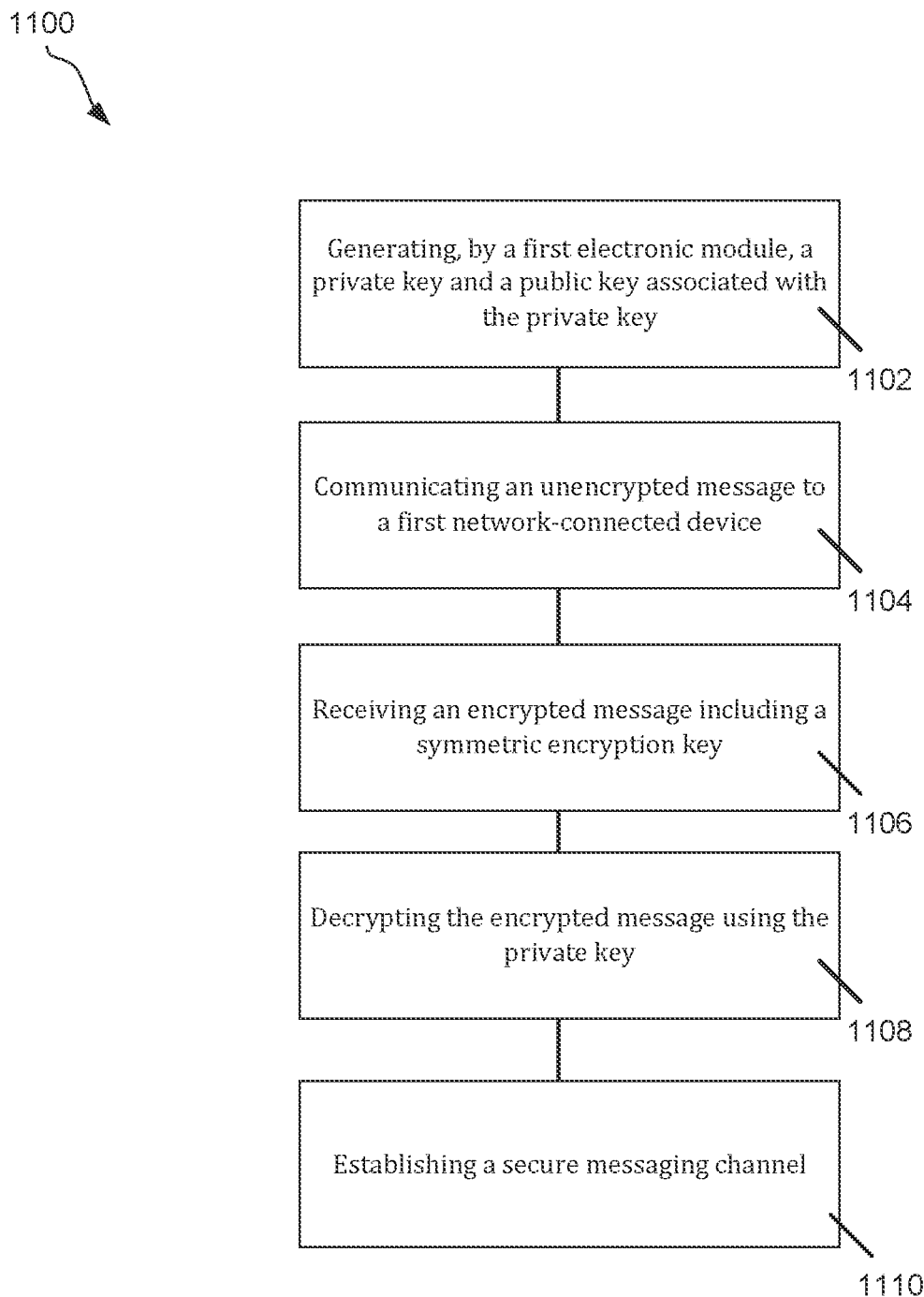
FIG. 11 is a flow diagram showing an example key sharing process performed by the first electronic module shown in FIG. 4.

FIG. 11 is a flow diagram showing an example key sharing process 1100 performed by an electronic module of the system shown in FIG. 4. As an example, the process 1100 may be executed by the first electronic module 402A. Process 1100 includes operation 1102 of generating, by a first electronic module, a private key and a public key associated with the private key. Operation 1102 may, as an example, be identified with steps 502 and 702A shown in FIGS. 5 and 7, respectively.

Process 1100 includes operation 1104 of communicating, by the first electronic module, an unencrypted message, including the public key, to a first network-connected device using a first module-to-device communication link. Operation 1104 may, as an example, be identified with steps 504 and 704 shown in FIGS. 5 and 7, respectively.

Process 1100 includes operation 1106 of receiving, from the first network-connected device, an encrypted message including a symmetric encryption key generated by a second electronic module. Operation 1106 may, as an example, be identified with steps 518 and 718 shown in FIGS. 5 and 7, respectively.

Process 1100 includes operation 1108 of decrypting, by the first electronic module, the encrypted message using the private key, where decrypting using the private key makes the symmetric encryption key available to the first electronic module. Operation 1108 may, as an example, be identified with steps 520 and 720 shown in FIGS. 5 and 7, respectively.

Process 1100 includes operation 1110 of establishing, by the first electronic module, a secure messaging channel with the second electronic module based on at least the symmetric encryption key. Operation 1110 may, as an example, be identified with steps 522 and 722 shown in FIGS. 5 and 7, respectively.

Figure 12:
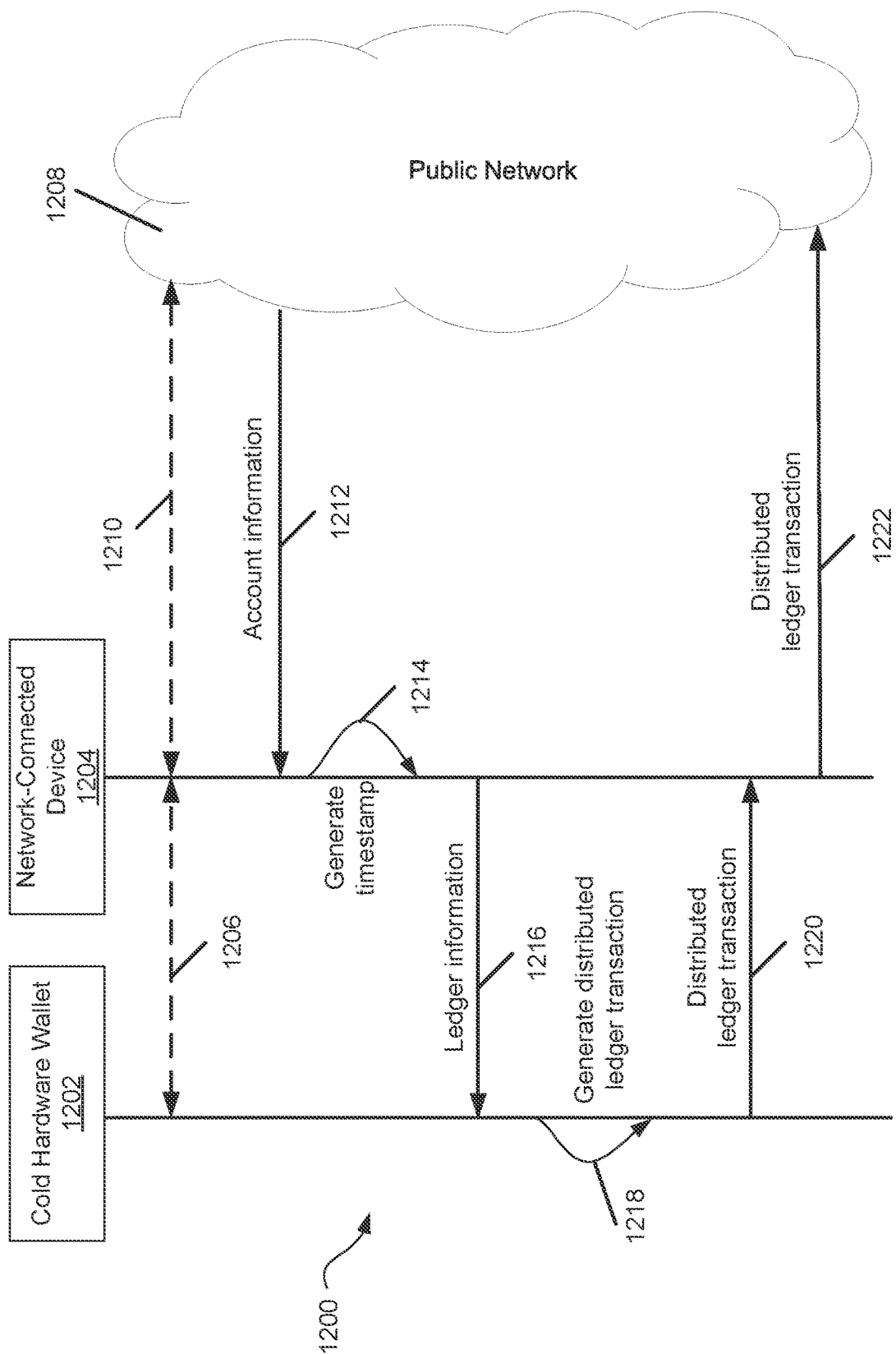
FIG. 12 shows an example sequence diagram illustrating a process for generating a distributed ledger transaction on a cold hardware wallet.

FIG. 12 shows an example sequence diagram 1200 illustrating a process for generating a distributed ledger transaction on a cold hardware wallet. The sequence diagram 1200 shows a cold hardware wallet 1202 and a network-connected device 1204. The cold hardware wallet 1202 can be identified with either the first electronic module 402A or the second electronic module 402B. In instances where the cold hardware wallet 1202 is identified with the first electronic module 402A, the network-connected device 1204 can be the first network-connected device 404A. Additionally, in instances where the cold hardware wallet 1202 is identified with the second electronic module 402B, the network-connected device 1204 can be the second network-connected device 404B. The cold hardware wallet 1202 and the network-connected device 1204 are communicatively coupled by a private module-to-device communication link 1206 (e.g., which can be identified with either of the communication links 406A, 406B shown in FIG. 4). Furthermore, the network-connected device 1204 is communicatively coupled to a public network 1208 by a network communication link 1210 (e.g., which can be identified with the network communication link 408 shown in FIG. 4). As discussed above, the public network 1208 can include the Internet, a distributed ledger network (e.g., a Blockchain network), a cellular network, or other types of public messaging channels.

The distributed ledger transaction that is constructed on the cold hardware wallet 1202 can be a transfer of a cryptocurrency asset (e.g., a transfer of bitcoin or any other cryptocurrency). Account information (e.g., current account information) relating to the distributed ledger transaction is needed to construct the distributed ledger transaction, and the account information can be obtained from the public network 1208. However, since the cold hardware wallet 1202 is communicatively isolated from the public network 1208, it has no access to the current account information. Consequently, in some implementations, the network-connected device 1204 functions as an intermediate communication gateway and obtains account information from the public network 1208 (in operation 1212) via the network communication link 1210.

The account information that is obtained from the public network 1208 may include an indication of a previous distributed ledger transaction providing the cryptocurrency asset for the transfer, which is used as an input in the construction of the distributed ledger transaction. As an example, in a bitcoin transaction, the indication of a previous distributed ledger transaction providing the cryptocurrency asset can be a transaction ID of unspent transaction output (UTXO), an index of the UTXO, and the scriptpubkey of the UTXO. In such examples, the transaction ID and index of the UTXO can be used to identify the source of bitcoin for the transaction, and the scriptpubkey can be used as a locking script for the transaction that requires certain conditions to be met in order for a recipient to spend the bitcoin.

Additionally or alternatively, the account information may include fiat price information. For example, the account information can include an indication of an exchange rate between the cryptocurrency asset and one or more fiat currencies (e.g., the USD equivalent of a single bitcoin). Additionally or alternatively, the account information may include an indication of a fee for miners to settle a distributed ledger transaction on a distributed ledger network. In some instances, a distributed ledger transaction is settled when it is included in a block of a distributed ledger. The fee can be expressed as an amount of the cryptocurrency asset per byte of the distributed ledger transaction (e.g., 0.00000082 BTC/byte). In some instances, the fee can depend, at least in part, on the congestion on the distributed ledger network and the age of the transaction's inputs (e.g., how long ago the cryptocurrency asset being spent was received).

The network-connected device 1204 generates a timestamp (in operation 1214) that identifies when it received the account information from the public network 1208. The timestamp can be expressed as a date and/or a time the account information was received by the network-connected device 1204 from the public network 1208. In operation 1216, the timestamp and the account information are provided by the network-connected device 1204 to the cold hardware wallet 1202 as ledger information (e.g., via the private module-to-device communication link 1206). Consequently, the cold hardware wallet 1202 has time-stamped ledger information with which it can accurately construct a distributed ledger transaction.

As discussed above, the cold hardware wallet 1202 can provide offline storage of encryption keys (e.g., asymmetric key pairs, symmetric key pairs, or both). In operation 1218, the encryption keys stored in the cold hardware wallet 1202 can be used in conjunction with the ledger information received from the network-connected device 1204 to generate the distributed ledger transaction. For example, a private key generated and stored on the cold hardware wallet 1202 can be used to create a digital signature for the distributed ledger transaction. As another example, a public key generated and stored on the cold hardware wallet 1202 can be used to complete a transaction on the cold hardware wallet 1202. Consequently, the distributed ledger transaction is generated and signed on a cold device in a cold environment (e.g., cold hardware wallet 1202 that is communicatively isolated from the public network 1208), thus protecting the cold hardware wallet 1202 from network vulnerabilities (e.g., in the public network 1208) and protecting unencrypted data of the distributed ledger transaction (e.g., unencrypted data in an 'OP_RETURN' field of a bitcoin blockchain) from exposure. Furthermore, since the cold hardware wallet 1202 uses current network information (e.g., in the form of time-stamped ledger information), the cold hardware wallet 1202 can accurately construct the distributed ledger transaction. This is in contrast to existing methods of generating a distributed ledger transaction, where a desktop browser or a mobile network-connected device is used to construct a distributed ledger transaction, and where a cold hardware wallet is connected (e.g., via a USB connection) to the desktop browser or mobile network-connected device to provide the encryption keys and/or signed transaction to the desktop browser or mobile network-connected device for the construction of the distributed ledger transaction, thus exposing the cold device and its contents to network vulnerabilities.

In generating the distributed ledger transaction, the cold hardware wallet 1202 can first generate a message based on the account information. As an example, the message can identify the previous distributed ledger transaction providing the cryptocurrency asset for the transfer (e.g., transaction ID of UTXO, index of the UTXO, and scriptpubkey of the UTXO, and OP_RETURN data). The message can also indicate the intention to transfer the cryptocurrency asset. The cold hardware wallet 1202 identifies a private key stored in it, and generates a digital signature based on the message and the private key. As an example, the private key and the message can be provided as inputs to a cryptographic signing function that produces the digital signature as an output. Example cryptographic signing functions that can be executed by the cold hardware wallet 1202 (e.g., by the cryptographic co-processor 208) include, but are not limited to, RSA, RSA-DSS, Full Domain Hash, DSA, ECDSA, and SHA algorithms. The distributed ledger transaction is then generated based on the message and the digital signature. For example, the distributed ledger transaction can include the message and the digital signature as components. Since the digital signature, the message, and other components of the distributed ledger transaction are generated by the cold hardware wallet 1202, the size of the distributed ledger transaction can be accurately determined by the cold hardware wallet 1202. The cold hardware wallet 1202 can therefore calculate the cost for settlement of the distributed ledger transaction on the distributed ledger network using the size of the distributed ledger transaction and the fee information obtained from the network-connected device 1204. An indication of the cost for settlement of the distributed ledger transaction on the distributed ledger network can be included in the distributed ledger transaction.

In operation 1220, the distributed ledger transaction is sent from the cold hardware wallet 1202 to the network-connected device 1204 via the private module-to-device communication link 1206. The network-connected device 1204 subsequently forwards the distributed ledger transaction to the public network 1208 for settlement (e.g., by miners that include the distributed ledger transaction in a block of a distributed ledger.

The cold hardware wallet 1202 can generate encryption keys that are used to encrypt and decrypt communications from other similar electronic storage modules which have shared the same keys. In some instances, the encryption keys are generated by a dedicated cryptographic co-processor contained within the cold hardware wallet 1202 (e.g., the cryptographic co-processor 208). Once generated, the encryption keys are securely stored in a protected memory within the cold hardware wallet 1202 (e.g., the protected memory 207). In some instances, the encryption keys may be further encrypted by the cryptographic co-processor before storing them in the protected memory of the cold hardware wallet 1202.

In various implementations, the encryption keys are generated using a cryptographically secure pseudorandom number generator (CSPRNG). Specifically, the cold hardware wallet 1202 can use an external input to generate a salt to increase the randomness of entropy to a cryptographically secure level. The unique random entropy can be used by the cold hardware wallet 1202 to generate seeds or encryption keys for use by the cold hardware wallet 1202.

Figure 13:
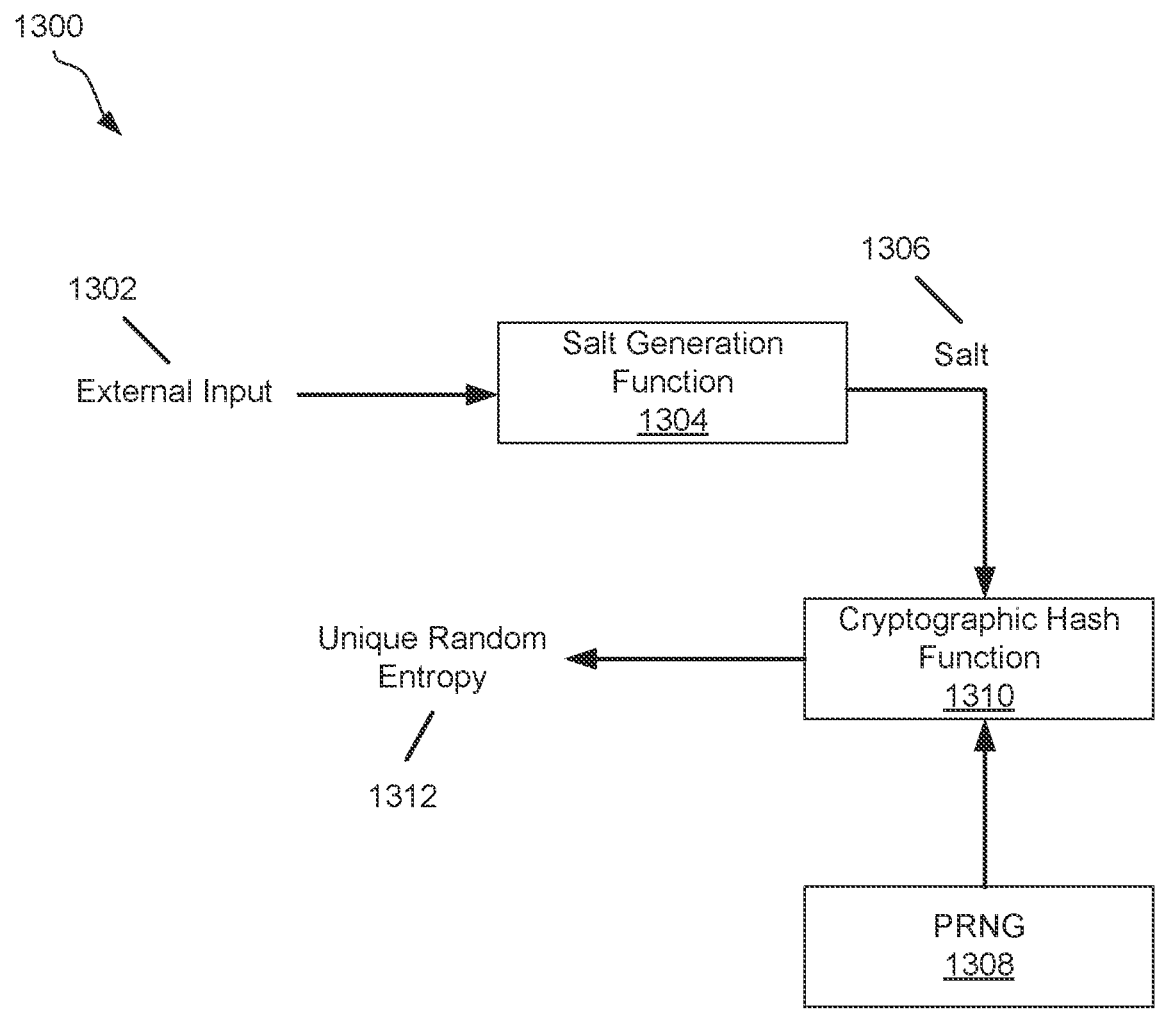
FIG. 13 shows an example block diagram illustrating a process of generating a unique random entropy based on external input provided to a cold hardware wallet.

FIG. 13 shows an example block diagram 1300 illustrating a process of generating a unique random entropy based on external input provided to a cold hardware wallet. In the example shown in FIG. 13, an external input 1302 is provided as an input to a salt generation function 1304 to generate a salt 1306. In some instances, the salt generation function 1304 can be a cryptographic hash function from the Secure Hash Algorithm (SHA) family of standards (e.g., the SHA3 hash function, such as the keccak256 hash function), RACE Integrity Primitives Evaluation Message Digest (RIPEMD), Whirlpool, or any other type of cryptographic hash function. The salt 1306 and the output of a pseudorandom number generator (PRNG) 1308 are provided as inputs to a cryptographic has function 1310 that outputs a unique random entropy 1312. The unique random entropy 1312 can then be used to generate seeds or encryption keys for use by the cold hardware wallet 1202.

The PRNG 1308 may be limited programmatically. For example, the software programs executed by the PRNG 1308 to generate its output (a pseudorandom number) may be predictable, thereby impeding randomness. If the source of entropy for a seed is not sufficient, symmetric or asymmetric encryption keys can be broken and the encrypted information revealed. For example, in a blockchain using public/private key pairs, the private keys can be exposed through their corresponding public keys (which may be shared in unencrypted form over a network). As another example, if an address is reused for receipt of change in a bitcoin transaction, or a bitcoin blockchain is used for secure message transmission and the address is reused, then related bitcoin stored at this address can also be exposed to theft. Therefore, by introducing the external input 1302, which in turn generates the salt 1306, the randomness of entropy is increased to a cryptographically secure level.

In some instances, at least one of the screen 104, data port 108, microphone or speaker 110, or cameras 112A or 112B can be used to provide an external input to the cold hardware wallet 1202. The external input can also be provided to the cold hardware wallet 1202 through a peripheral device coupled to the cold hardware wallet 1202. As discussed above, example peripheral devices include at least one of a camera, a microphone, a scanner, a keyboard device, or a mouse device.

The external input 1302 can be a bitmap of an image (e.g., obtained using one or both of the cameras 112A or 112B or provided by an external camera coupled to the cold hardware wallet 1202). In some instances, the image can be a 13 MPixel image, with 8 bits being used for each pixel. Consequently, the bitmap of the image can have a high degree of randomness, which increases the entropy/randomness of the unique random entropy 1312.

Figures 14A, 14B:
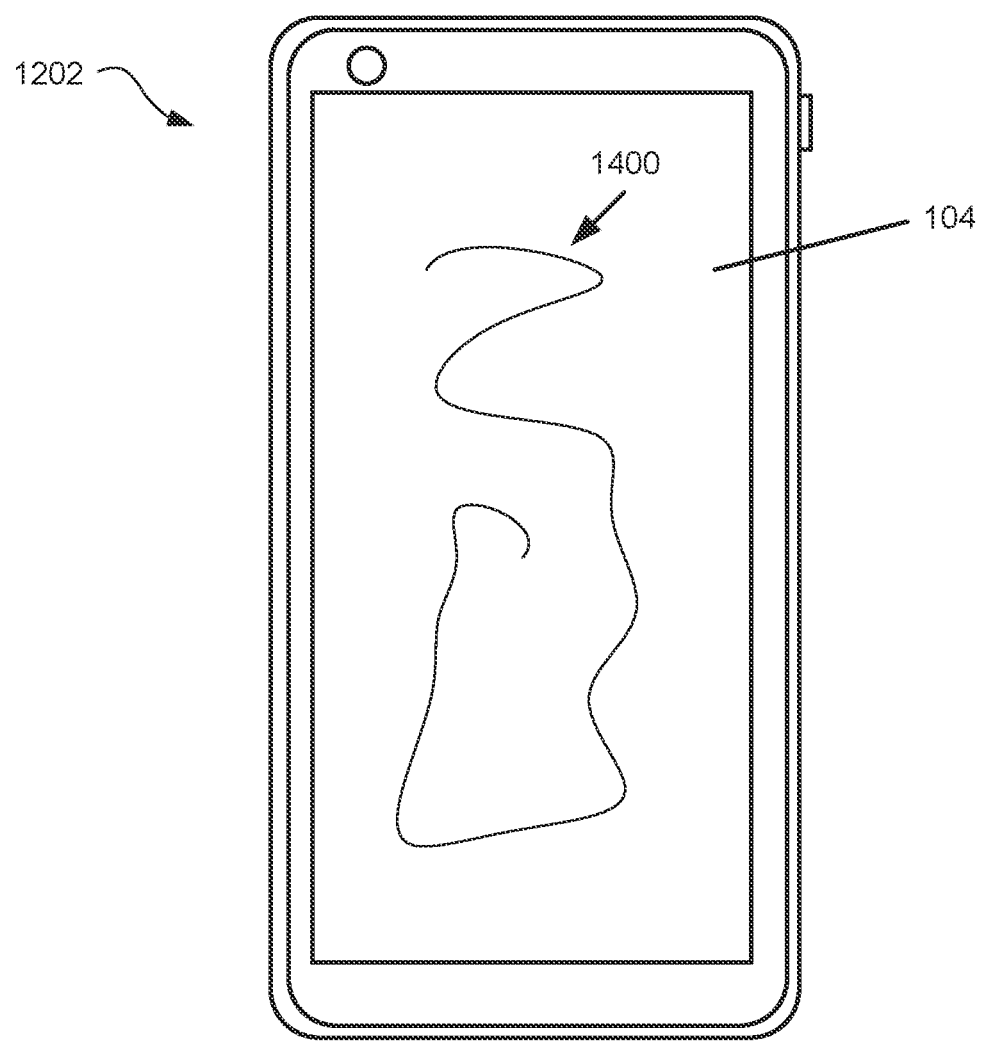
FIG. 14A shows an example sequence of alphanumeric characters that can be entered into a cold hardware wallet.
FIG. 14B shows an example trajectory of points that can be entered into a cold hardware wallet via its screen.

A sequence of alphanumeric characters can be entered into the cold hardware wallet 1202 (e.g., via an image of a keyboard displayed on the screen 104 or an external keyboard coupled to the cold hardware wallet 1202). Each alphanumeric character may be provided at a distinct time. FIG. 14A shows an example sequence of alphanumeric characters (e.g., the string "ABCDE") that can be entered into the cold hardware wallet 1202. FIG. 14A also shows a distinct time (e.g., t1, t2, t3, t4, t5) each alphanumeric character was entered into the cold hardware wallet 1202. FIG. 14A additionally shows a time difference between adjacent alphanumeric characters. In some instances, the alphanumeric characters (e.g., the string "ABCDE" in FIG. 14A) can be used as the external input 1302 provided to the salt generation function 1304. Additionally or alternatively, the distinct times (e.g., the times t1, t2, t3, t4, t5) or the time differences (e.g., (t2-t1), (t3-t2), (t4-t3), (t5-t4)) can be used as the external input 1302 provided to the salt generation function 1304.

A trajectory of points can be entered into the cold hardware wallet 1202 (e.g., via the screen 104 or a peripheral device coupled to cold hardware wallet 1202). As an example, a curve of any shape, a line, or a collection of curves or lines can be entered into the cold hardware wallet 1202. FIG. 14B shows an example trajectory of points 1400 that can be entered into the cold hardware wallet 1202 via its screen 104. Each point in the trajectory of points may be provided at a distinct time. In some instances, the spatial coordinates of the trajectory of points can be used as the external input 1302 provided to the salt generation function 1304. Additionally or alternatively, the distinct times or the time differences between adjacent points in the trajectory can be used as the external input 1302 provided to the salt generation function 1304.

Figure 15:
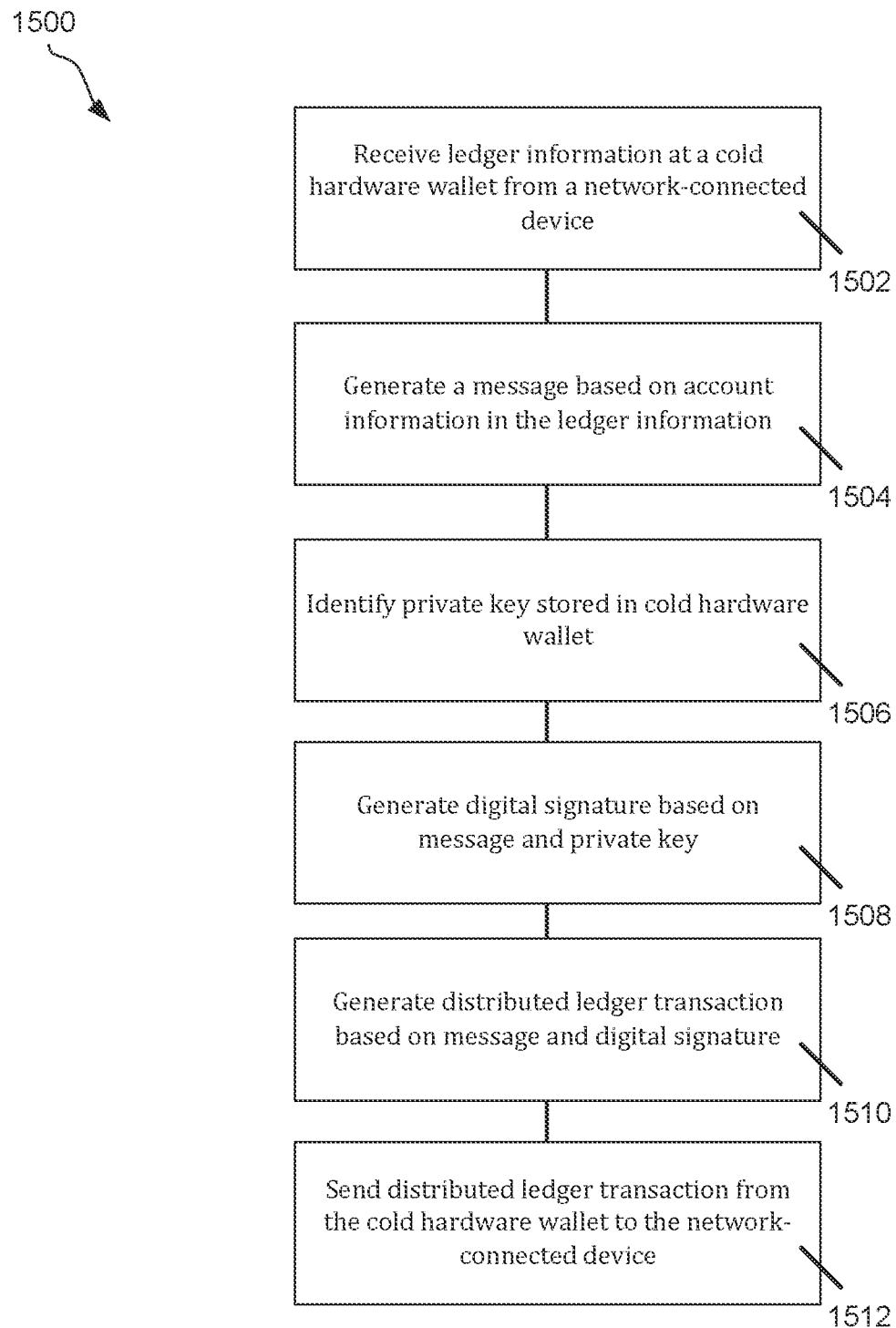
FIG. 15 is a flow diagram showing an example process for generating a distributed ledger transaction on a cold hardware wallet.

FIG. 15 is a flow diagram showing an example process 1500 for generating a distributed ledger transaction on a cold hardware wallet. The process 1500 may include additional or different operations, and the operations shown in FIG. 15 may be performed in the order shown or in another order. In some cases, one or more of the operations shown in FIG. 15 are implemented as processes that include multiple operations, sub-processes for other types of routines. In some cases, operations can be combined, performed in another order, performed in parallel, iterated or otherwise repeated or performed in another manner. The process 1500 may be performed by the cold hardware wallet 1202 shown in FIG. 12 or by the example electronic module 100 shown in FIGS. 1A and 1B.

At 1502, ledger information from a network-connected device (e.g., device 1204 in FIG. 12) is received at a cold hardware wallet (e.g., wallet 1202 in FIG. 12). Operation 1502 may be identified with operation 1216 shown in FIG. 12. The ledger information can be provided via a private module-to-device communication link (e.g., link 1206 in FIG. 12) between the cold hardware wallet and the network-connected device. As discussed above in reference to FIG. 12, the ledger information can include account information for the distributed ledger transaction and a timestamp (e.g., a day and/or time) identifying when the ledger information was received at the network-connected device from a public network (e.g., network 1208 in FIG. 12). The account information can include an indication of a previous distributed ledger transaction providing the cryptocurrency asset for the transfer; an indication of an exchange rate between the cryptocurrency asset and one or more fiat currencies; or an indication of a fee for settlement of the distributed ledger transaction on a distributed ledger network.

At 1504, 1506, 1508, and 1510, the cold hardware wallet generates the distributed ledger transaction. Operations 1504, 1506, 1508, and 1510 can be identified with operation 1218 shown in FIG. 12. At 1504, a message, which can include an intent to transfer a cryptocurrency asset (e.g., bitcoin), is generated based on the account information. At 1506, a private key stored in the cold hardware wallet is identified, and a digital signature is generated (at 1508) based on the message and the private key. As an example, the message and the private key may be provided as inputs into a cryptographic signing function to generate the digital signature. At 1510, the distributed ledger transaction is generated based on the message and the digital signature.

At 1512, the distributed ledger transaction is sent from the cold hardware wallet to the network-connected device (e.g., via the private module-to-device communication link for forwarding to the public network for settlement). Operation 1512 may be identified with operation 1220 shown in FIG. 12.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on the user interface (e.g., screen 104, microphone or speaker 110, camera 112A or 112B, a combination thereof, or the like) of the electronic module for displaying and providing information to the user and by which the user can provide input to the electronic module. The user interface of the electronic module can also provide feedback to a user; for example, feedback provided to the user can be any form of sensory feedback, e.g., visual feedback, auditory feedback, or tactile feedback; and input from the user can be received in any form, including acoustic, speech, or tactile input.

Example 1A: A method, including: generating, by a first electronic module, a private key and a public key associated with the private key; communicating, by the first electronic module, an unencrypted message, including the public key, to a first network-connected device using a first module-to-device communication link; relaying, by the first network-connected device, the unencrypted message to a second network-connected device using a network communication link; relaying, by the second network-connected device, the unencrypted message to a second electronic module using a second module-to-device communication link; generating, by the second electronic module and in response to reception of the unencrypted message, a symmetric encryption key; generating, by the second electronic module, an encrypted message by encrypting the symmetric encryption key using the public key; communicating, by the second electronic module, the encrypted message to the second network-connected device using the second module-to-device communication link; relaying, by the second network-connected device, the encrypted message to the first network-connected device using the network communication link; relaying, by the first network-connected device, the encrypted message to the first electronic module using the first module-to-device communication link; decrypting, by the first electronic module, the encrypted message using the private key, wherein decrypting using the private key makes the symmetric encryption key available to the first electronic module; and establishing a secure messaging channel, based on at least the symmetric encryption key, between the first electronic module and the second electronic module.

In some implementations of Example 1A, at least one of the unencrypted message (including the public key) or the encrypted message may be included in one or more data fields of a cryptocurrency blockchain (e.g., an 'OP_RETURN' field of a bitcoin blockchain).

Example 2A: The method of Example 1A, wherein the unencrypted message further includes a serial number of the first electronic module.

Example 3A: The method of Example 2A, further including: storing, by the second electronic module and in response to reception of the unencrypted message, the serial number of the first electronic module.

Example 4A: The method of Example 1A, wherein generating the encrypted message includes: generating, by the second electronic module, the encrypted message by encrypting the symmetric encryption key and a serial number of the second electronic module using the public key, wherein decrypting using the private key makes the serial number of the second electronic module available to the first electronic module.

Example 5A: The method of Example 4A, further including: storing, by the first electronic module and in response to decrypting the encrypted message, the serial number of the second electronic module.

Example 6A: The method of Example 4A, further including: providing, by the first electronic module and via the secure messaging channel, a serial number of the first electronic module to the second electronic module.

Example 7A: The method of Example 4A, further including: storing, by the second electronic module, the serial number of the first electronic module.

Example 8A: The method of Example 1A, further including, after establishing the secure messaging channel: providing, by the first electronic module and via the secure messaging channel, a serial number of the first electronic module to the second electronic module; and providing, by the second electronic module and via the secure messaging channel, a serial number of the second electronic module to the first electronic module.

Example 9A: The method of Example 1A, wherein the unencrypted message further includes additional data available at the first electronic module, the additional data including a unique identifier of the first electronic module, an image, a video recording, an audio recording, a document, a text message, or a combination thereof. In some implementations of Example 9A, the additional data may be included in one or more data fields of a cryptocurrency blockchain.

Example 10A: The method of Example 1A, wherein the encrypted message is generated by encrypting the symmetric encryption key and additional data available at the first electronic module using the public key, the additional data including a unique identifier of the second electronic module, an image, a video recording, an audio recording, a document, a text message, or a combination thereof.

Example 11A: The method of Example 1A, further including: establishing the first module-to-device communication link between the first network-connected device and the first electronic module using a first electronic module application running on the first network-connected device; and establishing the second module-to-device communication link between the second network-connected device and the second electronic module using a second electronic module application running on the second network-connected device.

Example 12A: The method of Example 1A, wherein the network communication link includes a cellular network communication link, an internet protocol network communication link, or a combination thereof.

Example 13A: The method of Example 1A, wherein at least one of the first module-to-device communication link or the second module-to-device communication link includes a peer-to-peer communication link.

Example 14A: The method of Example 1A, wherein generating the private key and the public key associated with the private key includes: generating, by a cryptographic processor of the first electronic module, the public key based on the private key; and storing the private key in a protected memory module of the first electronic module.

Example 15A: The method of Example 14, further including: providing, by the cryptographic processor, the public key to a general-purpose processor of the first electronic module.

Example 16A: A non-transitory computer-readable medium stores instructions that are operable when executed by data processing apparatus to perform one or more operations of Examples 1A to 15A.

Example 17A: A method, includes: generating, by a first electronic module, a private key and a public key associated with the private key; communicating, by the first electronic module, an unencrypted message, including the public key, to a first network-connected device using a first module-to-device communication link; receiving, from the first network-connected device, an encrypted message including a symmetric encryption key generated by a second electronic module; decrypting, by the first electronic module, the encrypted message using the private key, wherein decrypting using the private key makes the symmetric encryption key available to the first electronic module; and establishing, by the first electronic module, a secure messaging channel with the second electronic module based on at least the symmetric encryption key.

Example 18A: The method of Example 17A, wherein the unencrypted message further includes a unique identifier of the first electronic module.

Example 19A: The method of Example 17A, wherein decrypting using the private key makes a unique identifier of the second electronic module available to the first electronic module.

Example 20A: The method of Example 19A, further including: storing, by the first electronic module and in response to decrypting the encrypted message, the unique identifier of the second electronic module.

Example 21A: The method of Example 17A, further including: providing, by the first electronic module and via the secure messaging channel, a unique identifier of the first electronic module to the second electronic module.

Example 22A: The method of Example 17A, further including: receiving, by the first electronic module and via the secure messaging channel, a unique identifier of the second electronic module.

Example 23A: The method of Example 17A, wherein the unencrypted message further includes additional data available at the first electronic module, the additional data including a unique identifier of the first electronic module, an image, a video recording, an audio recording, a document, a text message, or a combination thereof.

Example 24A: The method of Example 17A, further including: establishing the first module-to-device communication link between the first network-connected device and the first electronic module using a first electronic module application running on the first network-connected device.

Example 25A: The method of Example 17A, wherein the first module-to-device communication link includes a peer-to-peer communication link.

Example 26A: The method of Example 17A, wherein generating the private key and the public key associated with the private key includes: generating, by a cryptographic processor of the first electronic module, the public key based on the private key; and storing the private key in a protected memory module of the first electronic module.

Example 27A: The method of Example 26A, further including: providing, by the cryptographic processor, the public key to a general-purpose processor of the first electronic module.

Example 28A: A non-transitory computer-readable medium stores instructions that are operable when executed by data processing apparatus to perform one or more operations of Examples 17A to 27A.

Example 29A: An electronic module includes: a processor; and memory comprising instructions, which when executed by the processor, cause the electronic module to perform operations of Examples 17A to 27A.

Example 30: A method for generating a distributed ledger transaction includes: receiving, at a cold hardware wallet, ledger information from a network-connected device via a private module-to-device communication link between the cold hardware wallet and the network-connected device. The ledger information is received at the network-connected device from a public network, and the ledger information includes: account information for the distributed ledger transaction; and a timestamp identifying when the account information was received by the network-connected device from the public network. The cold hardware wallet may generate a message based on the account information, the message including a transfer of a cryptocurrency asset; identify a private key stored in the cold hardware wallet; generate a digital signature based on the message and the private key; and generate the distributed ledger transaction based on the message and the digital signature. The distributed ledger transaction is sent from the cold hardware wallet to the network-connected device via the private module-to-device communication link for forwarding to the public network for settlement.

Implementations of Example 30 may include one or more of the following features. The account information includes at least one of: an indication of a previous distributed ledger transaction providing the cryptocurrency asset for the transfer; an indication of an exchange rate between the cryptocurrency asset and one or more fiat currencies; or an indication of a fee for settlement of the distributed ledger transaction on a distributed ledger network. The account information includes the indication of the fee for settlement of the distributed ledger transaction, and the distributed ledger transaction includes an indication of a cost for settlement of the distributed ledger transaction on the distributed ledger network, where the cost is based on the fee and a size of the distributed ledger transaction. The timestamp identifies at least one of a date or a time the account information was received by the network-connected device from the public network. The method further includes generating a salt based on an external input provided to the cold hardware wallet, and generating a unique random entropy based on the salt, the unique random entropy for generating at least one of a seed or an encryption key. The external input can include a bitmap of an image obtained using a camera of the cold hardware wallet, and the salt is generated based on the bitmap. The external input can include a sequence of alphanumeric characters provided to a touchscreen of the cold hardware wallet, where each alphanumeric character is provided to the touchscreen at a distinct time. Generating the salt based on the external input can include generating the salt based on at least one of the distinct times or time differences between adjacent alphanumeric characters of the sequence of alphanumeric characters. The external input can include a trajectory of points provided by to a touchscreen of the cold hardware wallet, each point provided to the touchscreen at a distinct time. Generating the salt based on the external input can include generating the salt based on at least one of the trajectory of points, the distinct times, or time differences between adjacent points of the trajectory of points. The external input may be provided to the cold hardware wallet via a peripheral device coupled to the cold hardware wallet by at least one of a wired connection or a wireless connection. The peripheral device can include at least one of a camera, a microphone, a scanner, a keyboard device, or a mouse device.

Example 31: A cold hardware wallet includes a communications interface (e.g., interface 212 and/or 214) and a cryptographic processor (e.g., cryptographic co-processor 208). The communications interface may be configured to: receive ledger information from a network-connected device via a private module-to-device communication link between the cold hardware wallet and the network-connected device, wherein the ledger information is received at the network-connected device from a public network. The ledger information may include: account information for the distributed ledger transaction; and a timestamp identifying when the account information was received by the network-connected device from the public network. The communications interface may be further configured to send a distributed ledger transaction to the network-connected device via the private module-to-device communication link for forwarding to the public network for settlement. The cryptographic processor may be configured to: generate a message based on the account information, the message comprising a transfer of a cryptocurrency asset; identify a private key stored in the cold hardware wallet; generate a digital signature based on the message and the private key; and generate the distributed ledger transaction based on the message and the digital signature.

Implementations of Example 31 may include one or more of the following features. The account information includes at least one of: an indication of a previous distributed ledger transaction providing the cryptocurrency asset for the transfer; an indication of an exchange rate between the cryptocurrency asset and one or more fiat currencies; or an indication of a fee for settlement of the distributed ledger transaction on a distributed ledger network. The account information includes the indication of the fee for settlement of the distributed ledger transaction, and the distributed ledger transaction includes an indication of a cost for settlement of the distributed ledger transaction on the distributed ledger network, where the cost is based on the fee and a size of the distributed ledger transaction. The cryptographic processor may be configured to generate a salt based on an external input provided to the cold hardware wallet, and generate a unique random entropy based on the salt, the unique random entropy for generating at least one of a seed or an encryption key. The cold hardware wallet may include a touchscreen. The external input may include a sequence of alphanumeric characters provided to the touchscreen, where each alphanumeric character is provided to the touchscreen at a distinct time. The cryptographic processor may be configured to generate the salt based on at least one of the distinct times or time differences between adjacent alphanumeric characters of the sequence of alphanumeric characters. The external input may include a trajectory of points provided by to a touchscreen of the cold hardware wallet, each point provided to the touchscreen at a distinct time. The cryptographic processor may be configured to generate the salt based on at least one of the trajectory of points, the distinct times, or time differences between adjacent points of the trajectory of points. The communications interface may be configured to connect to a peripheral device via a wired connection or a wireless connection, and the external input is provided to the cold hardware wallet via the peripheral device.

In an Example 32, a non-transitory computer-readable medium stores instructions that are operable when executed by data processing apparatus to perform one or more operations of the Example 30 or 31.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the present disclosure.

What is claimed is:

1. A method for generating a distributed ledger transaction on a cold hardware wallet, the method comprising:
   receiving, at the cold hardware wallet, ledger information of a first transaction message from a network-connected device via a private module-to-device communication link between the cold hardware wallet and the network-connected device, wherein the first transaction message is received at the network-connected device from a public network and is securely protected by the private module-to-device communication link, and the ledger information comprises:
   account information associated with the first transaction message; and
   a timestamp identifying when the account information was received by the network-connected device from the public network;
   by operation of the cold hardware wallet, generating a second transaction message based on the account information from the received ledger information, wherein the second transaction message comprises a transfer of a cryptocurrency asset;
   identifying a private key stored in the cold hardware wallet;
   by operation of the cold hardware wallet, generating a digital signature based on the secured transaction message and the stored private key; and
   generating the distributed ledger transaction on the cold hardware wallet based on the second transaction message and the generated digital signature; and
   sending the distributed ledger transaction from the cold hardware wallet to the network-connected device via the private module-to-device communication link for forwarding to the public network for settlement.

2. The method of claim 1, wherein the account information comprises at least one of:
an indication of a previous distributed ledger transaction providing the cryptocurrency asset for the transfer;
an indication of an exchange rate between the cryptocurrency asset and one or more fiat currencies; or
an indication of a fee for settlement of the distributed ledger transaction on a distributed ledger network.

3. The method of claim 2, wherein the account information comprises the indication of the fee for settlement of the distributed ledger transaction, and the distributed ledger transaction comprises an indication of a cost for settlement of the distributed ledger transaction on the distributed ledger network, wherein the cost is based on the fee and a size of the distributed ledger transaction.

4. The method of claim 1, wherein the timestamp identifies at least one of a date or a time the account information was received by the network-connected device from the public network.

5. The method of claim 1, comprising:
generating a salt based on an external input provided to the cold hardware wallet; and
generating a unique random entropy based on the salt, the unique random entropy for generating at least one of a seed or an encryption key.

6. The method of claim 5, wherein the external input comprises a bitmap of an image obtained using a camera of the cold hardware wallet, and generating the salt based on the bitmap.

7. The method of claim 5, wherein the external input comprises a sequence of alphanumeric characters provided to a touchscreen of the cold hardware wallet, each alphanumeric character provided to the touchscreen at a distinct time.

8. The method of claim 7, wherein generating the salt based on the external input comprises generating the salt based on at least one of the distinct times or time differences between adjacent alphanumeric characters of the sequence of alphanumeric characters.

9. The method of claim 5, wherein the external input comprises a trajectory of points provided to a touchscreen of the cold hardware wallet, each point provided to the touchscreen at a distinct time.

10. The method of claim 9, wherein generating the salt based on the external input comprises generating the salt based on at least one of the trajectory of points, the distinct times, or time differences between adjacent points of the trajectory of points.

11. The method of claim 5, wherein the external input is provided to the cold hardware wallet via a peripheral device coupled to the cold hardware wallet by at least one of a wired connection or a wireless connection.

12. The method of claim 11, wherein the peripheral device comprises at least one of a camera, a microphone, a scanner, a keyboard device, or a mouse device.

13. A cold hardware wallet, comprising:
a communications interface configured to:
receive, at the cold hardware wallet, ledger information of a first transaction message from a network-connected device via a private module-to-device communication link between the cold hardware wallet and the network-connected device, wherein the ledger information first transaction message is received at the network-connected device from a public network and is securely protected by the private module-to-device communication link, wherein the ledger information comprises:
account information associated with the first transaction message; and
a timestamp identifying when the account information was received by the network-connected device from the public network; and
a cryptographic processor configured to:
generate a second transaction message based on the account information from the received ledger information, wherein the second transaction message comprises a transfer of a cryptocurrency asset;
identify a private key stored in the cold hardware wallet;
generate a digital signature based on the second transaction message and the stored private key; and
generate the distributed ledger transaction on the cold hardware wallet based on the second transaction message and the generated digital signature;
wherein the communications interface is configured to send the distributed ledger transaction from the cold hardware wallet to the network-connected device via the private module-to-device communication link for forwarding to the public network for settlement.

14. The cold hardware wallet of claim 13, wherein the account information comprises at least one of:
an indication of a previous distributed ledger transaction providing the cryptocurrency asset for the transfer;
an indication of an exchange rate between the crypto currency asset and one or more fiat currencies; or
an indication of a fee for settlement of the distributed ledger transaction on a distributed ledger network.

15. The cold hardware wallet of claim 14, wherein the account information comprises the indication of the fee for settlement of the distributed ledger transaction, and the distributed ledger transaction comprises an indication of a cost for settlement of the distributed ledger transaction on the distributed ledger network, wherein the cost is based on the fee and a size of the distributed ledger transaction.

16. The cold hardware wallet of claim 13, wherein the cryptographic processor is configured to:
generate a salt based on an external input provided to the cold hardware wallet; and
generate a unique random entropy based on the salt, the unique random entropy for generating at least one of a seed or an encryption key.

17. The cold hardware wallet of claim 16, comprising a touchscreen, and wherein the external input comprises a sequence of alphanumeric characters provided to the touchscreen, each alphanumeric character provided to the touchscreen at a distinct time.

18. The cold hardware wallet of claim 17, wherein the cryptographic processor is configured to generate the salt based on at least one of the distinct times or time differences between adjacent alphanumeric characters of the sequence of alphanumeric characters.

19. The cold hardware wallet of claim 16, comprising a touchscreen, and wherein the external input comprises a trajectory of points provided to the touchscreen of the cold hardware wallet, each point provided to the touchscreen at a distinct time.

20. The cold hardware wallet of claim 19, wherein the cryptographic processor is configured to generate the salt based on at least one of the trajectory of points, the distinct times, or time differences between adjacent points of the trajectory of points.

21. The cold hardware wallet of claim 16, wherein the communications interface is configured to connect to a peripheral device via a wired connection or a wireless connection, and the external input is provided to the cold hardware wallet via the peripheral device.

* * * * *

UNITED STATES PATENT AND TRADEMARK OFFICE
CERTIFICATE OF CORRECTION

PATENT NO. : 11,210,658 B2
APPLICATION NO. : 17/242935
DATED : December 28, 2021
INVENTOR(S) : Silvestri et al.

It is certified that error appears in the above-identified patent and that said Letters Patent is hereby corrected as shown below:

In the Specification

Column 5, Line 38, Delete "114)" and insert -- 104) -- therefor

Column 9, Line 9, Delete "402A," and insert -- 402B, -- therefor

Column 13, Line 8, Delete "208." and insert -- 408. -- therefor

Column 13, Line 14, Delete "208" and insert -- 408 -- therefor

Column 14, Line 8, Delete "208" and insert -- 408 -- therefor

Column 16, Lines 14-15, Delete "second" and insert -- first -- therefor

Column 17, Line 37, Delete "208," and insert -- 408, -- therefor

Column 17, Line 38, Delete "208" and insert -- 408 -- therefor

Column 17, Line 66, Delete "402A." and insert -- 402B. -- therefor

Column 18, Line 50, Delete "208" and insert -- 408 -- therefor

Column 20, Line 18, Delete "208." and insert -- 408. -- therefor

Column 20, Line 24, Delete "208" and insert -- 408 -- therefor

Column 21, Line 27, Delete "208" and insert -- 408 -- therefor

Column 21, Line 31, Delete "402B)," and insert -- 402A), -- therefor

Signed and Sealed this
Fifth Day of July, 2022

Katherine Kelly Vidal
*Director of the United States Patent and Trademark Office*

CERTIFICATE OF CORRECTION (continued)
U.S. Pat. No. 11,210,658 B2

Column 22, Line 28, Delete "208." and insert -- 408. -- therefor

Column 22, Line 35, Delete "208" and insert -- 408 -- therefor

Column 24, Line 8, Delete "208," and insert -- 408, -- therefor

Column 24, Line 9, Delete "208" and insert -- 408 -- therefor

Column 24, Line 37, Delete "402A." and insert -- 402B. -- therefor

Column 24, Line 60, Delete "208" and insert -- 408 -- therefor

Column 25, Line 43, Delete "208," and insert -- 408, -- therefor

Column 25, Line 45, Delete "208" and insert -- 408 -- therefor

In the Claims

Column 38, Line 61, In Claim 1, delete "secured" and insert -- second -- therefor Column 39, Lines 64-65, In Claim 13, after "wherein the", delete "ledger information"

Column 40, Lines 30-31, In Claim 14, delete "crypto currency" and insert -- cryptocurrency -- therefor